(12) United States Patent  
Hayashi et al.

(10) Patent No.: US 8,786,834 B2  
(45) Date of Patent: Jul. 22, 2014

(54) OPTICAL DISTANCE MEASURING APPARATUS

(75) Inventors: Kunihiro Hayashi, Tokyo (JP); Kaoru Kumagai, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 49 days.

(21) Appl. No.: 13/408,534

(22) Filed: Feb. 29, 2012

(65) Prior Publication Data

US 2012/0224164 A1    Sep. 6, 2012

(30) Foreign Application Priority Data

Mar. 1, 2011  (JP) ................... 2011-044405

(51) Int. Cl.
*G01C 3/08* (2006.01)
(52) U.S. Cl.
USPC ................ 356/4.01; 356/5.01; 356/5.1
(58) Field of Classification Search
USPC ........... 356/3.01–3.15, 4.01–4.1, 5.01–5.15, 356/6–22, 28, 28.5
See application file for complete search history.

(56) References Cited

U.S. PATENT DOCUMENTS

| 4,469,939 | A | * | 9/1984 | Utagawa | ................... | 250/204 |
| 6,433,860 | B1 | * | 8/2002 | Ohishi | ................... | 356/5.01 |
| 2003/0090647 | A1 | | 5/2003 | Isogai et al. | | |
| 2005/0172503 | A1 | | 8/2005 | Kumagai et al. | | |
| 2006/0132752 | A1 | | 6/2006 | Kane | | |
| 2008/0205707 | A1 | | 8/2008 | Braunecker et al. | | |
| 2009/0268193 | A1 | | 10/2009 | Ohishi et al. | | |
| 2011/0216305 | A1 | | 9/2011 | Hayashi et al. | | |

FOREIGN PATENT DOCUMENTS

| CN | 1678883 | A | 10/2005 |
| CN | 101273282 | A | 9/2008 |
| EP | 1102034 | A2 | 5/2001 |
| JP | 2000-147122 | A | 5/2000 |
| JP | 2001-343238 | A | 12/2001 |
| JP | 2008-527360 | A | 7/2008 |
| JP | 2010-151788 | A | 7/2010 |
| JP | 2010-190759 | A | 9/2010 |
| WO | 2010038645 | A1 | 4/2010 |

OTHER PUBLICATIONS

An Office Action issued by the Chinese Patent Office on Mar. 5, 2014, which corresponds to Chinese Patent Application No. 201210050595.2 and is related to U.S. Appl. No. 13/408,534.

(Continued)

*Primary Examiner* — Luke Ratcliffe
(74) *Attorney, Agent, or Firm* — Studebaker & Brackett PC

(57) ABSTRACT

An optical distance measuring apparatus which emits emission light from a light source to an object and receives reflection light from the object with a light-receiving unit, and performs distance measurement based on the emission light and the reflection light, the apparatus including a deflection mechanism provided in an optical path to an irradiation light axis from the light source to the object, the deflection mechanism configured to reflect the emission light to incline a direction of the emission light with respect to the emission light axis of the light source, wherein the deflection mechanism has an optically conjugate relationship with a predetermined position on the emission light axis or on the irradiation light axis, the predetermined position being closer to the object than the deflection mechanism when viewed from the light source.

8 Claims, 22 Drawing Sheets

(56) References Cited

OTHER PUBLICATIONS

The extended European search report issued on Mar. 27, 2014, which corresponds to European Patent Application No. 12157271.3-1557 and is related to U.S. Appl. No. 13/408,534.

The first Office Action issued by the Chinese Patent Office on Mar. 5, 2014, which corresponds to Chinese Patent Application No. 201210050595.2 and is related to U.S. Appl. No. 13/408,534; with English language translation.

* cited by examiner

OPTICAL DISTANCE MEASURING APPARATUS

PRIORITY CLAIM

The present application is based on and claims priority from Japanese Patent Application No. 2011-044405, filed on Mar. 1, 2011, the disclosure of which is hereby incorporated by reference in its entirety.

BACKGROUND

1. Technical Field

The present invention relates to an optical distance measuring apparatus for survey.

2. Description of the Related Art

For example, there is known an optical distance measuring apparatus for survey which measures the distance to a measurement point by emitting a pulse laser beam to the measurement point, receiving a reflected pulse light from the measurement point, and measuring a time difference and/or phase difference between the emission light and the reflection light. This type of optical distance measuring apparatus typically includes an imaging optical system and a display to display an image captured by the imaging optical system in order to make it possible to visually recognize a predetermined visual field centered on the collimation direction so that the distance to a desired position in the visual field (image) can be measured (for example, see Published Japanese Translation of PCT International Application No. 2008-527360). With the optical distance measuring apparatus, the distance to a desired position is measured by changing a beam path using a micro scanner element without causing the collimation direction to be changed.

Although the above-described optical distance measuring apparatus theoretically enables the distance to a desired position to be measured, only the use of a micro scanner element is disclosed and no specific configuration is described. For this reason, it is practically difficult to measure the distance to a desired position.

SUMMARY

The present invention has been made in view of the above-mentioned situation, and it is an object of the invention to provide an optical distance measuring apparatus which can measure the distance to a desired position without causing the collimation direction to be changed.

One aspect of the invention is an optical distance measuring apparatus which emits emission light from a light source to an object and receives reflection light from the object with a light-receiving unit, and performs distance measurement based on the emission light and the reflection light, the apparatus including a deflection mechanism provided in an optical path to an irradiation light axis from the light source to the object, the deflection mechanism configured to reflect the emission light to incline a direction of the emission light with respect to the emission light axis of the light source, in which the deflection mechanism has an optically conjugate relationship with a predetermined position on the emission light axis or on the irradiation light axis, the predetermined position being closer to the object than the deflection mechanism when viewed from the light source.

BRIEF DESCRIPTION OF THE DRAWINGS

FIG. 8A illustrates how an image P1, which is acquired by a second image capturing unit 12 through a second telescope unit 11, is displayed on the display unit 6, FIG. 8C illustrates the positional relationship between a utility pole Up and its axis Uo;

FIG. 15A illustrates a state in which a prism unit 72a is located on the reflection light axis Lr, and FIG. 15B illustrates a state in which the prism unit 72a is displaced from the reflection light axis Lr;

DESCRIPTION OF THE PREFERRED EMBODIMENTS

Hereinafter, the embodiments of an optical distance measuring apparatus according to the present invention will be described with reference to the accompanying drawings.
[Embodiment 1]

Figure 1:
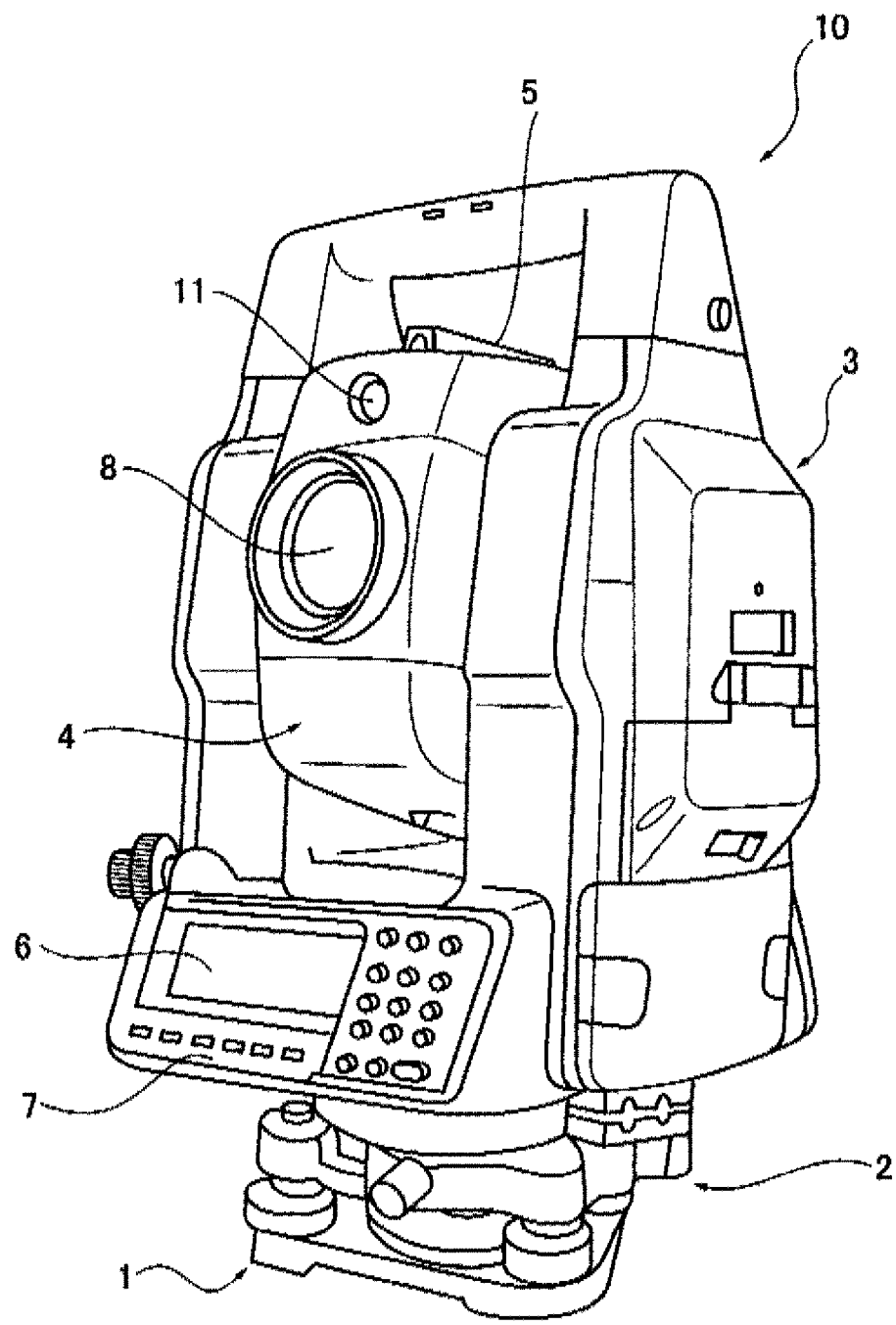
FIG. 1 is a perspective view schematically illustrating an optical distance measuring apparatus 10 in Embodiment 1 according to the present invention.
Figure 2:
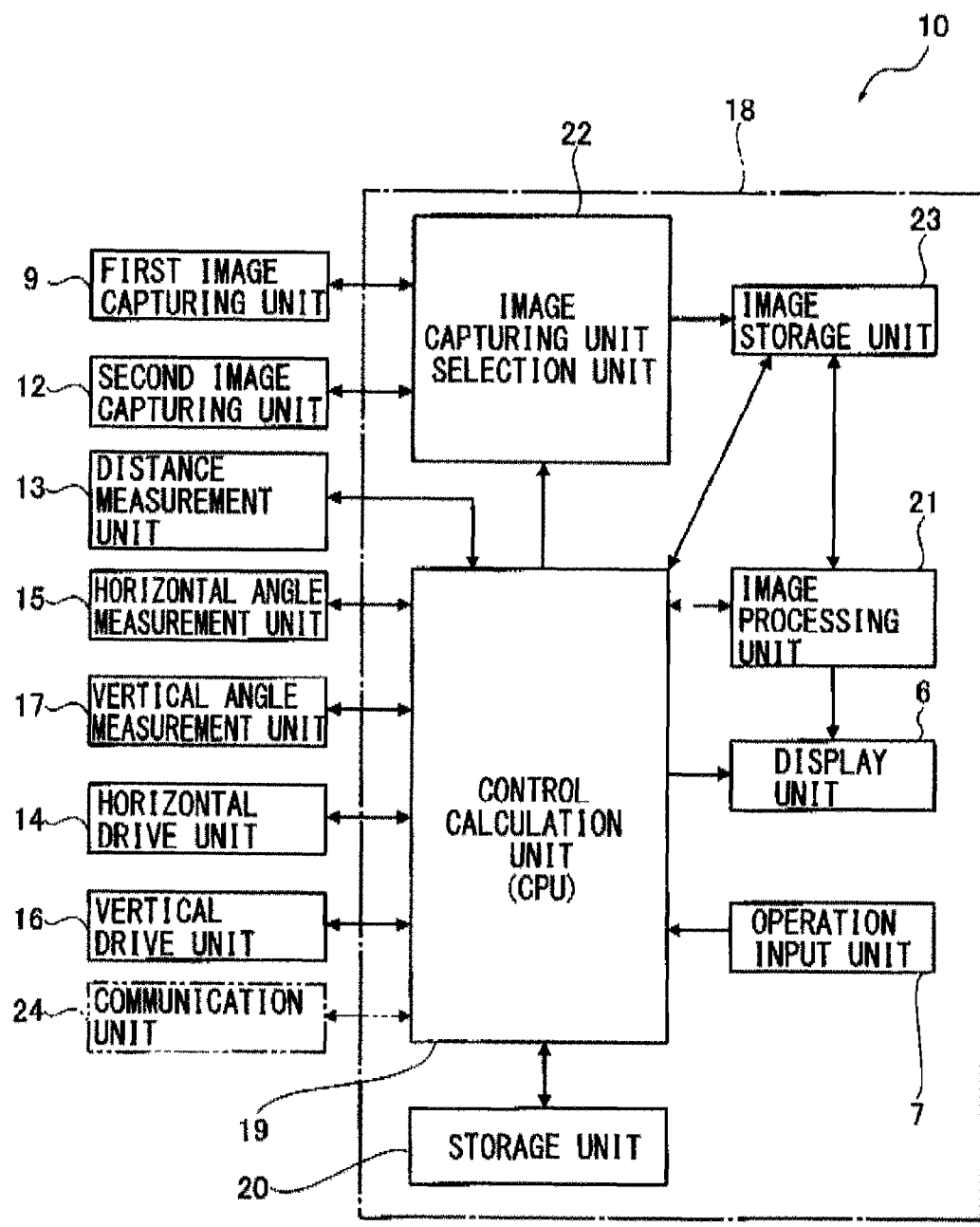
FIG. 2 is a block diagram illustrating the functional configuration of the optical distance measuring apparatus 10.

First, a schematic configuration of an optical distance measuring apparatus 10 in Embodiment 1 according to the present invention is described. FIG. 1 is a perspective view schematically illustrating the optical distance measuring apparatus 10 as an example of an optical distance measuring apparatus according to the present invention. FIG. 2 is a block diagram illustrating the functional configuration of the optical distance measuring apparatus 10.

The optical distance measuring apparatus 10 has a function as an EDM (Electronic Distance Meter) which can measure the distance to an object by emitting light (emission light) toward the object to be measured (see reference symbol O in FIG. 6), receiving a return light reflected by the object, and measuring a time difference and/or phase difference between the emission light and the reflection light. As illustrated in FIGS. 1 and 2, the optical distance measuring apparatus 10 is a total station in Embodiment 1, and includes a leveling portion 1, a base portion 2, a mount portion 3, and a lens-barrel portion 4.

The leveling portion 1 is a portion attached to a tripod (not shown), and is capable of detecting an inclination of the optical distance measuring apparatus 10 (lens-barrel portion 4). The leveling portion 1 is provided with the base portion 2 whose inclined angle with respect to the leveling portion 1 is changeable. The mount portion 3 is rotatably provided around the vertical axis of the base portion 2. The mount portion 3 is provided with a display unit 6 and an operation input unit 7. The operation input unit 7 is an operation unit for utilizing various functions of the optical distance measuring apparatus 10, and outputs inputted information to the later-described control calculation unit 19 (see FIG. 2).

The lens-barrel portion 4 is rotatably provided around the horizontal axis (hereinafter also referred to as a gudgeon pin axis Ch (see FIG. 3)) of the mount portion 3. The lens-barrel portion 4 is provided with a front/rear sight 5 which sets a substantial collimation direction of the optical distance measuring apparatus 10. The lens-barrel portion 4 has a first telescope 8 that collimate an object to be measured, and a first image capturing unit 9 (see FIG. 2) which captures an image (telescope image) via an optical system of the first telescope 8 in the collimation direction. In addition, the lens-barrel portion 4 has a second telescope 11 having a magnification and a range of visual field respectively lower and wider than those of the first telescope 8, and a second image capturing unit 12 (see FIG. 2) which captures an image (wide angle image) via an optical system of the second telescope 11 in the collimation direction or in the substantially collimation direction. The lens-barrel portion 4 has a built-in distance measurement unit 13 (see FIG. 2) which shares the optical system of the first telescope 8. The distance measurement unit 13 emits distance measurement light, receives light reflected from an object to be measured, and optically measures the distance to the object.

The mount portion 3, which allows the lens-barrel portion 4 to be rotated around the horizontal axis, is provided with a horizontal drive unit 14 and a horizontal angle measurement unit 15 (see FIG. 2). The horizontal drive unit 14 can rotate the mount portion 3 around the vertical axis with respect to the base portion 2, i.e., in the horizontal direction. The horizontal angle measurement unit 15 can detect (measure) the horizontal angle of the collimation direction by detecting the horizontal rotation angle of the mount portion 3 with respect to the base portion 2.

In addition, the mount portion 3 is provided with a vertical drive unit 16 and a vertical angle measurement unit 17 (see FIG. 2). The vertical drive unit 16 can rotate the lens-barrel portion 4 around the horizontal axis (the gudgeon pin axis Ch (see FIG. 3)) with respect to the mount portion 3, i.e., in the vertical direction. The vertical angle measurement unit 17 can detect (measure) the vertical angle of the collimation direction by detecting the vertical rotation angle of the lens-barrel portion 4 with respect to the mount portion 3.

Furthermore, the mount portion 3 has a built-in control unit 18 (see FIG. 2). The control unit 18 can direct the lens-barrel portion 4 to a predetermined direction and scan a predetermined range by controlling the horizontal drive unit 14 and the vertical drive unit 16 (see FIG. 2) to rotate the mount portion 3 and the lens-barrel portion 4 as needed. The control unit 18 can obtain an image with a desired magnification by controlling switching between the first telescope 8 and the second telescope 11. The control unit 18 can further measure the distance to a predetermined measurement point by controlling the distance measurement unit 13 (see FIG. 2). Thus, the leveling portion 1, the base portion 2, the mount portion 3, the lens-barrel portion 4, the front/rear sight 5, the first telescope 8 (the first image capturing unit 9), the second telescope 11 (the second image capturing unit 12), the distance measurement unit 13, the horizontal drive unit 14, the horizontal angle -measurement unit 15, the vertical drive unit 16, and the vertical angle measurement unit 17 serve as a survey unit that is drive-controlled by the control unit 18.

As illustrated in FIG. 2, the control unit 18 has the display unit 6, the operation input unit 7, the control calculation unit 19, a storage unit 20, an image processing unit 21, an image capturing unit selection unit 22, and an image storage unit 23.

The control calculation unit 19 controls the operation of control unit 18 by a program stored in storage unit 20 in generalization. The storage unit 20 stores a calculation program necessary for the measurement, a drive controlling processing program for the operation of each unit, an image processing program for performing image processing, an image analysis processing program for analyzing an image, and a program such as a drive processing program for designation of measurement position (adjustment of deflection position) using the later-described deflection unit 34.

The output values for the measurement from the distance measurement unit 13, the horizontal angle measurement unit 15, and the vertical angle measurement unit 17 are inputted to the control calculation unit 19. The control calculation unit 19 measures (calculates) the distance, the vertical angle, and the horizontal angle based on these output values, and stores a result of the measurement in the storage unit 20 and displays the result on the display unit 6.

The image capturing unit selection unit 22 is provided to select between the first image capturing unit 9 and the second image capturing unit 12. An image acquired (captured) by the selected first image capturing unit 9 or the second image capturing unit 12 is stored in the image storage unit 23 and is displayed on the display unit 6. The image processing unit 21 performs image processing on the image stored in the image storage unit 23 (for example, the image acquired by the first image capturing unit 9) as needed, and stores the processed image in the image storage unit 23 and displays the processed image on the display unit 6.

Figure 3:
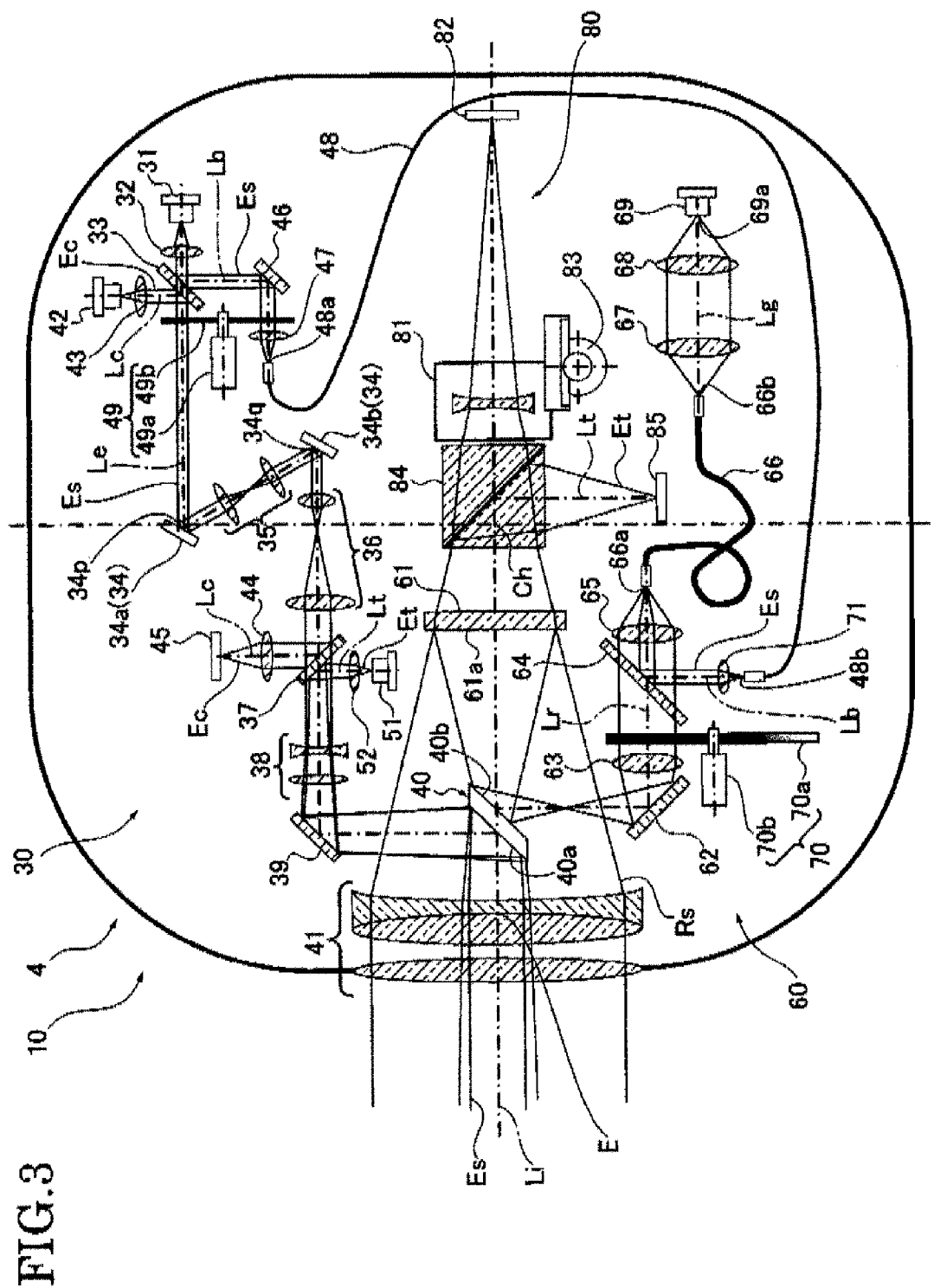
FIG. 3 is an explanatory diagram illustrating the optical configuration of a lens-barrel portion 4 of the optical distance measuring apparatus 10.

Next, the optical configuration of the lens-barrel portion 4 (the first telescope 8 (the first image capturing unit 9) and the distance measurement unit 13) of the optical distance measuring apparatus 10 in Embodiment 1 according to the present invention will be described with reference to FIG. 3. FIG. 3 is an explanatory diagram illustrating the optical configuration of the lens-barrel portion 4 (excluding the second telescope 11 and the second image capturing unit 12) of the optical distance measuring apparatus 10.

As illustrated in FIG. 3, the lens-barrel portion 4 includes an emitting optical system 30, a receiving optical system 60, and an observation optical system 80. The emitting optical system 30 forms an emission light path in order to emit light (emission light) to an object to be measured (for example, see the reference symbol O in FIG. 6), and the emission light path allows distance measurement emission light Es to emit from an objective lens group 41 to the object along an irradiation light axis Li. The emitting optical system 30 includes a light source for distance measurement 31, a lens 32, a half mirror 33, and deflection units 34, a lens group 35 provided between the deflection units 34, a lens group 36, a polarized light beam splitting mirror 37, a lens group 38, a reflector 39, a double sided mirror 40, and the objective lens group 41.

Under the control of the control calculation unit 19 (see FIG. 2), the light source for distance measurement 31 emits light (distance measurement emission light Es) whose phase and intensity are properly adjusted. A pulse laser diode (PLD) is used for the light source for distance measurement 31 in Embodiment 1. The lens 32, the half mirror 33, and the deflection unit 34 are disposed on the emission light axis (emission light axis Le) of the light source for distance measurement 31. The lens 32 collimates the distance measurement emission light Es emitted from the light source for distance measurement 31 into a flux of light parallel to the emission light axis Le. The half mirror 33 allows part of the parallel light flux to transmit and reflects the rest of the parallel light flux onto a branched emission light axis Lb on which the later-described reflector 46 is disposed.

The deflection unit 34 is a deflection mechanism which changes an inclination of the part of parallel light flux (the distance measurement emission light Es) with respect to the emission light axis Le in the flux traveling direction, the part of parallel light flux having passed through the half mirror 33. The deflection unit 34 allows irradiation of light to a position different from a position on the irradiation light axis Li of the distance measurement emission light Es emitted from the objective lens group 41. Under the control of the control calculation unit 19, the deflection unit 34 can adjust the direction and a degree of inclination (the deflection position of the distance measurement emission light Es) with respect to the emission light axis Le. Here, the direction of the inclination refers to the radial direction with respect to the emission light axis Le, i.e., refers to the direction toward a position on the entire circumference centered on the emission light axis Le. The deflection unit 34 forms a reflection plane which is freely rotatable about two orthogonal axes along a plane perpendicular to the emission light axis Le.

Figure 4:
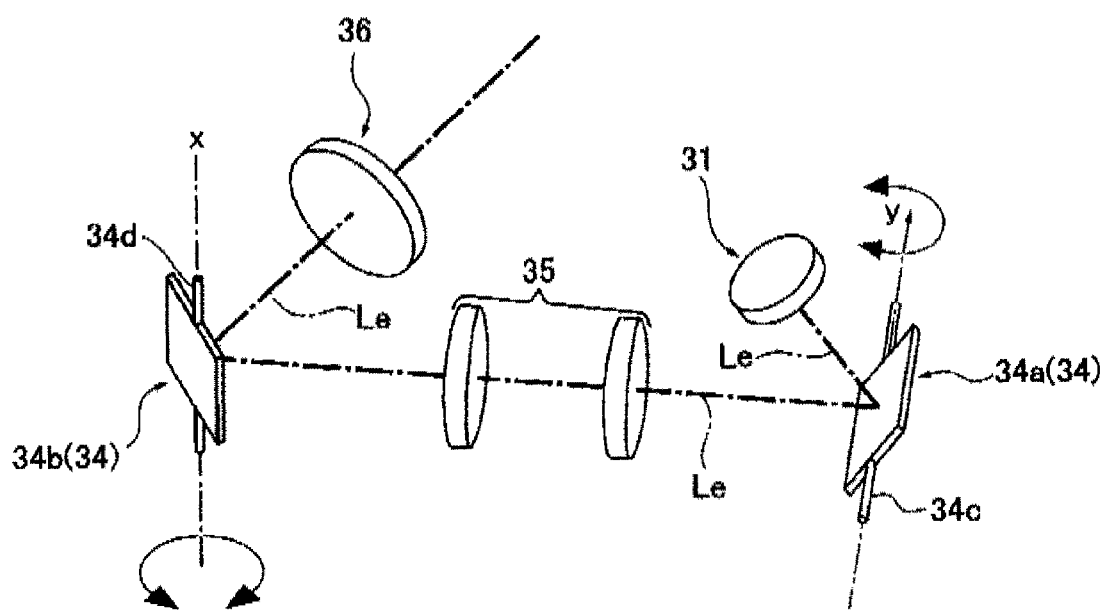
FIG. 4 is an explanatory diagram illustrating the configuration of a deflection unit 34 of the optical distance measuring apparatus 10.

In Embodiment 1, as illustrated in FIG. 4, the deflection unit 34 includes a deflection device 34*a* and a deflection device 34*b* that are provided as a pair so as to place the lens group 35 between the pair on the emission light axis Le. One of the deflection devices 34*a* and 34*b* forms a reflection plane which is capable of adjusting a degree of inclination around one axis along a plane perpendicular to the emission light axis Le, while the other forms a reflection plane which is capable of adjusting a degree of inclination around the other axis along a plane perpendicular to the emission light axis Le, the other axis being orthogonal to the one axis. In the deflection device 34*a* and the deflection device 34*b*, rotation axes 34*c*, 34*d* are set so as to be perpendicular to a plane containing the emission light axis Le of the incident light and the emission light axis Le of the reflection light in a standard state (with respect to which rotation is measured, and the rotation angle is 0 degree in the state). Both rotation axes 34*c* and 34*d* are perpendicular to each other in the emission light path. In Embodiment 1, the rotation axes 34*c* and 34*d* are assumed to be perpendicular to each other in the space coordinates. Therefore, the deflection unit 34 can change the traveling direction of the distance measurement emission light Es to one direction (also referred to as the x-axis direction) on a plane perpendicular to the emission light axis Le by rotating the deflection device 34*a* around the rotation axis 34*c* as needed. In addition, the deflection unit 34 can change the traveling direction of the distance measurement emission light Es to the other direction (also referred to as the y-axis direction) on the plane perpendicular to the emission light axis Le by rotating the deflection device 34*b* around the rotation axis 34*d* as needed. That is to say, the rotation axis 34*c* is disposed in the y-axis direction, and the rotation axis 34*d* is disposed in the x-axis direction.

Figure 5:
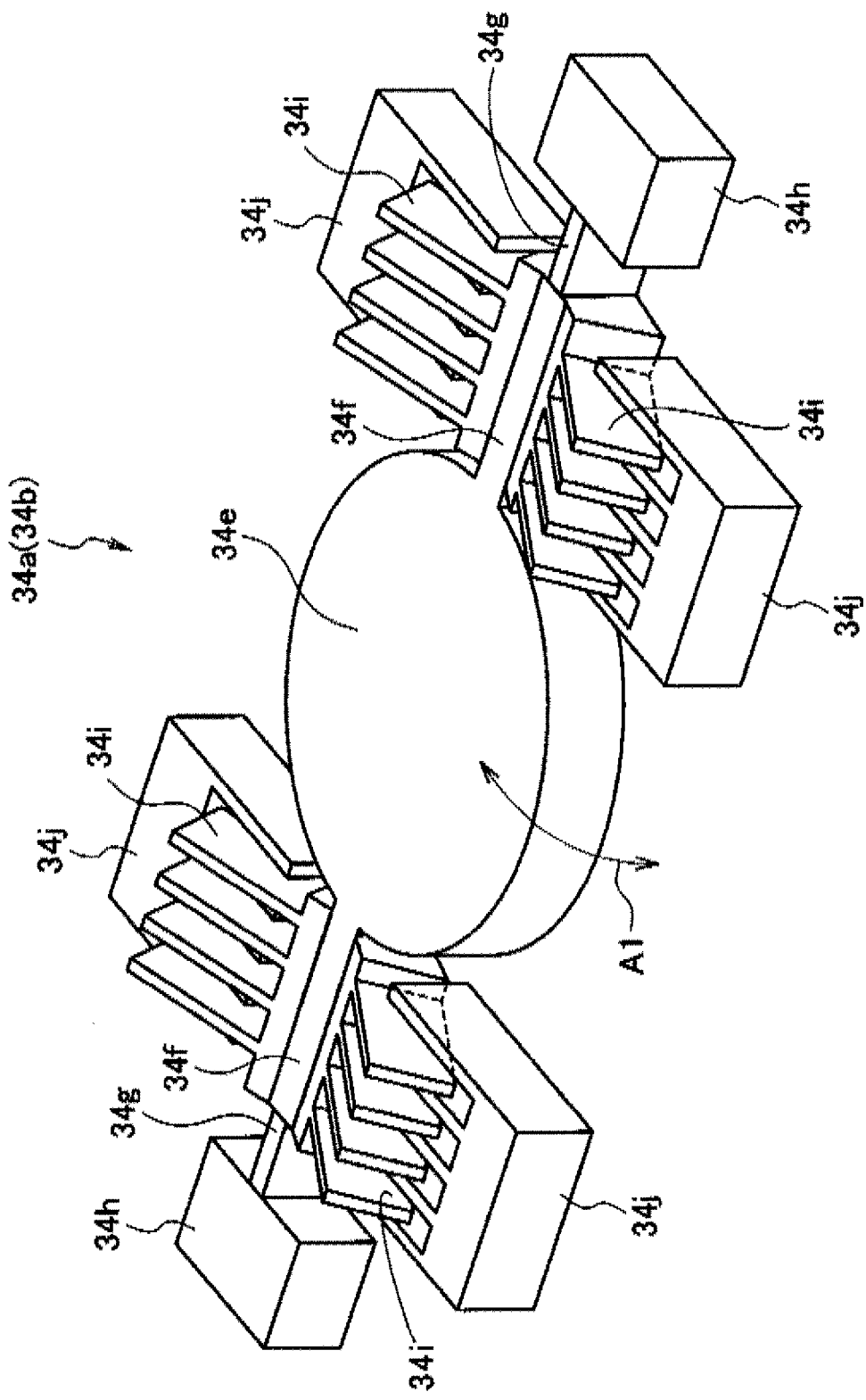
FIG. 5 is an explanatory diagram illustrating a deflection device 34a of the deflection unit 34 of the optical distance measuring apparatus 10.

In Embodiment 1, as illustrated in FIG. 5, the deflection device 34*a* and the deflection device 34*b* are formed with an MEMS (micro electro mechanical system) mirror which is obtained by etching an Si substrate using a photolithography technique. The deflection device 34*a* and the deflection device 34*b* have the same configuration excluding that the axial directions are set different and the arranged positions are different, thus the deflection device 34*a* is described in FIG. 5 and the following description.

As illustrated in FIG. 5, the deflection device 34*a* has a disc-like mirror plate 34*e*, a pair of shanks 34*f* extending from the peripheral surface of the disc-like mirror plate 34*e* in the diameter direction, a spring portion 34*g* provided at each extending end, a fixed portion 34*h* connected to the spring portion 34*g*, movable comb-teeth 34*i* provided at each shank 34*f*, and fixed comb-teeth 34*j* that each faces the movable comb-teeth 34*i*. In the deflection device 34*a*, under the control of the control calculation unit 19, the mirror plate 34*e* is rotated around the shanks 34f, 34f as needed in an arrow A1 direction by applying a voltage to each of the fixed comb-teeth 34j as needed.

As illustrated in FIG. 3, the lens group 35 is provided on the emission light axis Le between the deflection device 34a and the deflection device 34b in the deflection unit 34 so as to provide an optically conjugate relationship between a center position 34p on the emission light axis Le in the reflection plane of the deflection device 34a, and a center position 34q on the emission light axis Le in the reflection plane of the deflection device 34b. In Embodiment 1, the lens group 35 forms a telecentric optical system which allows parallel light flux (the distance measurement emission light Es and the later-described control support light Ec) reflected by (the reflection plane of) the deflection device 34a to pass through respective foci and directs the parallel light flux to (the reflection plane of) the deflection device 34b again as a parallel light flux. The deflection device 34b reflects the parallel light flux to the lens group 36.

The lens group 36 forms a telecentric optical system which allows the parallel light flux reflected by (the reflection plane of) the deflection device 34b to pass through respective foci and to direct again as a parallel light flux to the polarized light beam splitting mirror 37. The polarized light beam splitting mirror 3 allows part of parallel light flux (the control support light Ec) to transmit and reflects the rest of the parallel light flux to the later-described optical position sensor 45, the parallel light flux being emitted from the later-described light source for control instruction 42 and passing through the half mirror 33, the deflection unit 34, the lens group 35, and the lens group 36. In addition, the polarized light beam splitting mirror 37 reflects expanded light flux (tracking light Et) to the lens group 38 along the emission light axis Le, the expanded light flux being emitted from the later-described light source for tracking 51 and passing through the lens 52.

The lens group 38 generates an expanded light flux with an increasing beam diameter so as to match the diameter dimension of a first reflection plane 40a of the double sided mirror 40 based on part of the parallel light flux (the distance measurement emission light Es and the control support light Ec) which has passed through the polarized light beam splitting mirror 37, and the expanded light flux (the tracking light Et) reflected by the polarized light beam splitting mirror 37. In coordination with the lens group 36, the lens group 38 provides an optically conjugate relationship between the center position 34q on the emission light axis Le in the reflection plane of the deflection device 34b, and an emitting position E on the emission light axis Le. In other words, in the emission light path, the lens group 36 and the lens group 38 are disposed with respect to the center position 34q so that the emitting position E is formed at an arbitrary position on the emission light axis Le.

The reflector 39 reflects the expanded light flux (the distance measurement emission light Es, the control support light Ec, and the tracking light Et) to the first reflection plane 40a of the double sided mirror 40, the expanded light flux having passed through the lens group 38. The first reflection plane 40a of the double sided mirror 40 reflects the expanded light flux reflected by the reflector 39 to the objective lens group 41 along the irradiation light axis Li. The objective lens group 41 emits the distance measurement emission light Es along the irradiation light axis Li as a light flux substantially parallel to the irradiation light axis Li, the distance measurement emission light Es being taken from the distance measurement emission light Es and the control support light Ec that are formed as the expanded light flux. Here, the objective lens group 41 has a diameter dimension greater than that of the emitted distance measurement emission light Es. Substantially parallel herein includes "parallel" and refers to a state in which diverging angle is suppressed as much as possible, and is preferably in a range of 10" to 20".

The emitting optical system 30 includes an optical system for control for controlling the deflection position of the distance measurement emission light Es made by the deflection unit 34, and the light source for control instruction 42, a lens 43, a lens 44, and the optical position sensor 45 that serve as an designated position display optical system which designates a position of distance measurement. Under the control of the control calculation unit 19, the light source for control instruction 42 emits light whose phase and intensity are properly adjusted. In Embodiment 1, a laser diode (LD) which can emit visible light (light having a wavelength in a visible light band) is used, and the reason for this is that the emission light (the control support light Ec) from the light source for control instruction 42 also has a function of a designated position display optical system.

The lens 43 as well as the above-described half mirror 33 are disposed on the emission light axis (a control instruction optical axis Lc) of the light source for command instruction 42. The lens 43 forms the control support light Ec emitted from the light source for control instruction 42 into a light flux parallel to the control instruction optical axis Lc. The control support light Ec which is formed into the parallel light flux by the lens 43 is reflected by the half mirror 33 and travels along the emission light axis Le. Similarly to the distance measurement emission light Es, the control support light Ec on the emission light axis Le is deflected by the deflection unit 34, and is directed to the polarized light beam splitting mirror 37 through the lens group 35 and the lens group 36. As described above, the polarized light beam splitting mirror 37 allows part of the control support light Ec which has passed through the lens group 36 to transmit, while reflecting the rest of the control support light Ec to the lens 44 along the control instruction optical axis Lc.

The lens 44 focuses the rest of the control support light Ec reflected by the polarized light beam splitting mirror 37 into (the light-receiving surface of) the optical position sensor 45. The optical position sensor 45 forms a light-receiving surface which is perpendicular to the control instruction optical axis Lc so as to detect an incident position of the control support light Ec on the light-receiving surface, and outputs a signal of the detection to the control calculation unit 19. In Embodiment 1, the optical position sensor 45 is formed of a PSD (Position Sensitive Detector (optical position sensor)). Similarly to the distance measurement emission light Es, part of the control support lights Ec which has passed through the polarized light beam splitting mirror 37 is emitted along the irradiation light axis Li through the lens group 38, the reflector 39, the first reflection plane 40a of the double sided mirror 40, and the objective lens group 41.

Furthermore, the emitting optical system 30 includes the reflector 46, a lens 47, a first optical fiber 48, and a distance measurement light path switching unit 49. The reflector 46 is disposed on the branched emission light axis Lb in order to reflect the rest of the distance measurement emission light Es, which has been reflected by the half mirror 33, to the lens 47 which focuses the distance measurement emission light Es reflected by the reflector 46 into an incident end face 48a provided at one end of the first optical fiber 48. As described later, the distance measurement emission light Es is emitted from an emitting end face 48b provided at the other end of the first optical fiber 48. The distance measurement light path switching unit 49 switches to allow the distance measurement emission light Es either to travel along the emission light axis Le to be emitted on the irradiation light axis Li from the objective lens group 41, or to travel along the branched emission light axis Lb to be emitted from the emitting end face 48b of the first optical fiber 48, the distance measurement emission light Es being emitted from the light source for distance measurement 31 to be formed into a parallel light flux through the lens 32. In Embodiment 1, the distance measurement light path switching unit 49 is formed by attaching a light shielding plate 49b to the end of a motor 49a. The motor 49a is drive-controlled as needed by the control calculation unit 19 so that the light shielding plate 49b is located either on the emission light axis Le or the branched emission light axis Lb.

In addition, the emitting optical system 30 includes a light source for tracking 51 and a lens 52 that serve as a tracking optical system which allows the collimation direction to track the movement of an object. Under the control of the control calculation unit 19, emission of the light source for tracking 51 is adjusted as needed including zero emission. A laser diode (LD) is used for the light source for tracking 51 in Embodiment 1. The lens 52 as well as the above-described polarized light beam splitting mirror 37 are disposed on the emission light axis (tracking light axis Lt) of the light source for tracking 51. The lens 52 forms the tracking light Et emitted from the light source for tracking 51 into an expanded light flux with an increasing beam diameter along the tracking light axis Lt. The tracking light Et which is formed into the expanded light flux by the lens 52 is reflected by the polarized light beam splitting mirror 37 and travels along the emission light axis Le. Similarly to the distance measurement emission light Es, the tracking light Et on the emission light axis Le is emitted on the irradiation light axis Li through the lens group 38, the reflector 39, the first reflection plane 40a of the double sided mirror 40, and the objective lens group 41. The light source for tracking 51 and the lens 52 are set so that the tracking light Et emitted from the objective lens group 41 has a spread angle substantially equal to that of the visual field (see an image P in FIG. 6) in the observation optical system 80. As described later, the tracking light Et is reflected by an object and is received by a tracking area CCD 85, thereby enabling the position of the object to be detected and tracked.

The receiving optical system 60 forms a reflection light path for obtaining a distance measurement reflection light Rs which is reflection of the distance measurement emission light Es which is emitted from the emitting optical system 30 (objective lens group 41) and has traveled along the irradiation light axis Li through the object and the objective lens group 41. In addition to the double sided mirror 40 and the objective lens group 41, the receiving optical system 60 has a mirror 61, a reflector 62, a lens 63, a half mirror 64, a lens 65, a second optical fiber 66, a lens 67, a lens 68, a light-receiving device 69, an ND filter device 70, and a lens 71.

The mirror 61 is provided on the irradiation light axis Li and in the rear of the objective lens group 41 (on the side where the double sided mirror 40 is located). The mirror 61 is provided so that a flat reflection plane 61a is perpendicular to the irradiation light axis Li, and allows the distance measurement reflection light Rs to reflect to the second reflection plane 40b of the double sided mirror 40, the distance measurement reflection light Rs being formed into a reduced light flux with an decreasing beam diameter along the objective lens group 41. Accordingly, the mirror 61 is assumed to have a diameter dimension smaller than that of the objective lens group 41, and to have a diameter dimension larger than that of the double sided mirror 40. In the present embodiment, a half mirror is used as the mirror 61 in order to form the observation optical system 80 (the later-described collimation optical system). The distance measurement reflection light Rs reflected by the second reflection plane 40b reaches the reflector 62. In Embodiment 1, the focus (in the rear side) of the objective lens group 41 is located between the second reflection plane 40b and the reflector 62, and the lens 63 is a convex lens.

The reflector 62 reflects the distance measurement reflection light Rs to the lens 63, the distance measurement reflection light Rs being previously reflected by the second reflection plane 40b of the double sided mirror 40. The direction in which the distance measurement reflection light Rs travels after being reflected by the second reflection plane 40b, and the axis on which the lens 63 is disposed are assumed to be a reflection light axis Lr. The half mirror 64 and the lens 65 are disposed on the reflection light axis Lr, and an incident end face 66a of the second optical fiber 66 is located on the extension of the reflection light axis Lr.

The lens 63 forms the incident distance measurement reflection light Rs into a light flux parallel to the reflection light axis Lr. The distance measurement reflection light Rs which is formed into the parallel light flux is incident to the lens 65 through the half mirror 64. The distance measurement emission light Es is emitted from the light source for distance measurement 31, is reflected by half mirror 33, and is incident to (the incident end face 48a of) the first optical fiber 48 so that the half mirror 64 reflects the distance measurement emission light Es emitted from the emitting end face 48b to the lens 65 along the reflection-light axis Lr. The distance measurement emission light Es emitted from the emitting end face 48b is formed into a parallel light flux by the lens 71 as described later.

The lens 65 is disposed such that the focal position (in the rear side) is located on the incident end face 66a of the second optical fiber 66, and focuses the distance measurement reflection light Rs and the distance measurement emission light Es into the incident end face 66a of the second optical fiber 66, the distance measurement reflection light Rs being a parallel light flux passing through the half mirror 64, and the distance measurement emission light Es being a parallel light flux reflected by the half mirror 64. The distance measurement reflection light Rs and the distance measurement emission light Es that are incident to the incident end face 66a of the second optical fiber 66 are guided to the light-receiving optical axis Lg via the second optical fiber 66 toward the lens 67.

The lens 67 forms the distance measurement reflection light Rs and the distance measurement emission light Es, which are emitted from the emitting end surface 66b of the second optical fiber 66, into a light flux parallel to the light-receiving optical axis Lg. The lens 68 is provided in order to collect the distance measurement reflection light Rs and the distance measurement emission light Es which are formed into the parallel light flux. The lens 68 focuses the distance measurement reflection light Rs and the distance measurement emission light Es into a light-receiving surface of the light-receiving device 69. The light-receiving device 69, when receiving incident light to the light-receiving surface, outputs an electric signal according to the quantity of light. In the present embodiment, an APD (Avalanche Photodiode) is used as the light-receiving device 69.

In addition, the ND filter device 70 is provided between the lens 63 and the half mirror 64. The ND filter device 70 has an ND filter unit 70a in a disc-like form, and a motor 70b configured to rotate the ND filter unit 70a. The ND filter unit 70a is a filter member whose light transmission quantity varies gradually depending on the angular position of the ND filter unit 70a from a reference point. The ND filter device 70 is disposed so that part of the ND filter device 70a is located on the reflection-light axis Lr, and thus by driving the motor 70b under the control of the control calculation unit 19, the quantity of incident light to the lens 65, i.e., (the light-receiving surface 69a of) the light-receiving device 69 is adjusted, the incident light being the distance measurement reflection light Rs which has passed through the lens 63.

Furthermore, the lens 71 is provided on the branched emission light axis Lb from the emitting end face 48b of the first optical fiber 48, and the half mirror 64 is located at the extension of the branched emission light axis Lb. The lens 71 forms the distance measurement emission light Es emitted from the emitting end face 48b into a light flux parallel to the branched emission light axis Lb.

The observation optical system 80 is configured to observe an object which is irradiated with the distance measurement emission light Es and the control support light Ec that are emitted from the emitting optical system 30 (the objective lens group 41) along the irradiation light axis Li. The visual field (see the image P in FIG. 6) of the observation optical system 80 is set to have a subtended angle greater than the spread angles of the distance measurement emission light Es and the control support light Ec. The observation optical system 80 has an image-forming lens 81, an image capturing device 82, a lens drive unit 83, a beam splitter 84, and the tracking area CCD 85. The beam splitter 84, the image-forming lens 81, and the image capturing device 82 are on the irradiation light axis Li, and is provided in the rear of the mirror 61 (side opposite to the side of the mirror 61 on which the objective lens group 41 is located). The image-forming lens 81 forms the light (including the distance measurement reflection light Rs from an object) which has passed the mirror 61 as a half mirror and the beam splitter 84 into an image on the image capturing device 82. In order to place an image formation position of the image-forming lens 81 on the image capturing device 82, the lens drive unit 83 moves the image-forming lens 81 along the irradiation light axis Li.

Figure 6:
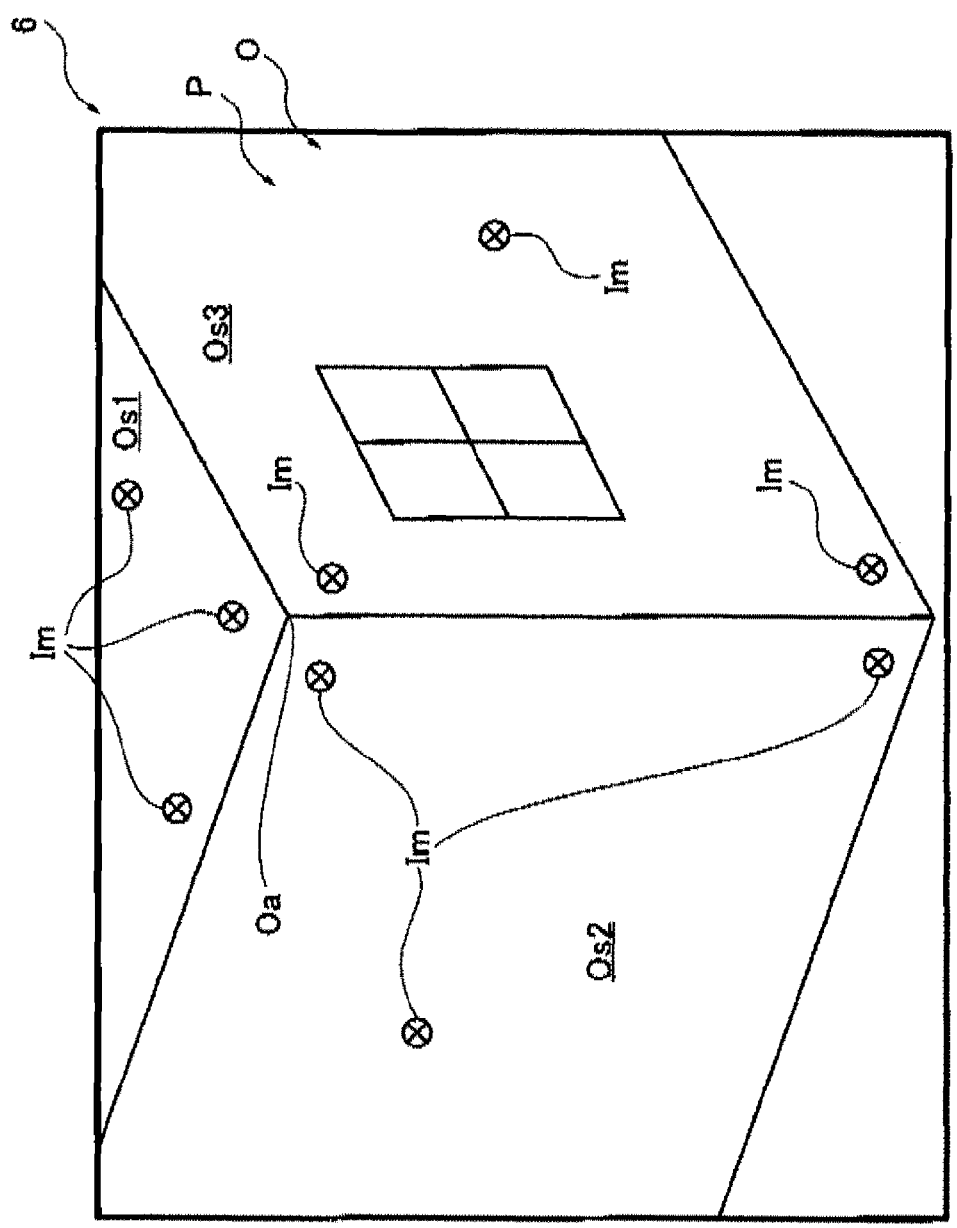
FIG. 6 is an explanatory diagram illustrating an image P displayed on a display unit 6.

The image capturing device 82, when receiving incident light to the receiving surface, outputs an electric signal according to the quantity of light to the image processing unit 21 (see FIG. 2) via the control calculation unit 19. The image processing unit 21 performs image processing as needed on the electric signal outputted from the image capturing device 82 to generate an image signal, and outputs the image signal to the display unit 6 (see FIG. 2). That is to say, the image capturing device 82 serves as the first image capturing unit 9. As illustrated in FIG. 6, the display unit 6 displays the image P which is set in a predetermined visual field, i.e., an angle of view in accordance with the image signal from the image processing unit 21. In Embodiment 1, the visual field in the observation optical system 80 is set in a range of ±1° by the objective lens group 41 and the image-forming lens 81. In the case where ¼-inch color CMOS with the resolution of SXGA (1280×1024) is used as the image capturing device 82, a resolving power of approximately 3" can be obtained.

Accordingly, a user of the optical distance measuring apparatus 10 can easily direct the irradiation light axis Li to an object (for example, see reference symbol O) by viewing the display screen of the display unit 6, and can observe the object on the irradiation light axis Li. Thus, the objective lens group 41 and the image-forming lens 81 serve as a collimation optical system of the first telescope 8 (the first image capturing unit 9), while the collimation optical system, the image capturing device 82, the image processing unit 21, and the display unit 6 serve as a collimation device.

As illustrated in FIG. 3, the tracking light Et which is emitted from the emitting optical system 30 (the objective lens group 41) along the irradiation light axis Li, and reflected by an object is formed into a reduced light flux with an decreasing beam diameter through the objective lens group 41, and reaches the beam splitter 84 through the mirror 61. The tracking light Et is then reflected by the beam splitter 84 along the tracking light axis Lt toward the tracking area CCD 85. The tracking area CCD 85 forms a light-receiving surface which is perpendicular to the tracking light axis Lt, detects an incident position of the tracking light Et on the light-receiving surface, and outputs a signal of the detection to the control calculation unit 19 (see FIG. 2). The control calculation unit 19 blinks the light source for tracking 51 in the tracking optical system, and determines the position of the object based on a difference in the detected value in the tracking area CCD 85 between when the tracking light Et is incident and when the tracking light Et is not incident. In addition, the control calculation unit 19 controls the drive of the horizontal drive unit 14 and the vertical drive unit 16 (see FIG. 2) in accordance with the position of the object by using the tracking optical system, and rotates the mount portion 3 and the lens-barrel portion 4 as needed, thereby adjusting the collimation direction to the moving object, i.e., performing automatic tracking. Furthermore, when automatic tracking is performed in accordance with the position of the object by using the tracking optical system, the control calculation unit 19 may adjust the collimation direction to the moving object, i.e., perform automatic tracking by adjusting the deflection unit 34 as needed instead of rotating but coordinating the mount portion 3 and the lens-barrel portion 4.

Therefore, the optical distance measuring apparatus 10 allows the distance measurement emission light Es emitted from the light source for distance measurement 31 of the emitting optical system 30 to pass through the lens 32, the half mirror 33, deflection unit 34, the lens group 35, the lens group 36, the polarized light beam splitting mirror 37, the lens group 38, the reflector 39, the first reflection plane 40a of the double sided mirror 40, and the objective lens group 41 so that a light flux parallel to the irradiation light axis Li is emitted. Thus, an object to be measured (for example, see the reference symbol O in FIG. 6), which is located on the irradiation light axis Li can be irradiated with the distance measurement emission light Es.

Here, the distance measurement reflection light Rs from an object is incident to the objective lens group 41 as a light flux substantially parallel to the irradiation light axis Li. The optical distance measuring apparatus 10 allows the distance measurement reflection light Rs incident to the objective lens group 41 to pass through the mirror 61, the second reflection plane 40b of the double sided mirror 40, the reflector 62, the lens 63, the half mirror 64, and the lens 65 so as to be made incident to the incident end face 66a of the second optical fiber 66. The distance measurement reflection light Rs then passes through the emitting end face 66b, the lens 67, the lens 68, and is incident to (the light-receiving surface 69a of) the light-receiving device 69.

The optical distance measuring apparatus 10 allows the distance measurement emission light Es emitted from the light source for distance measurement 31 of the emitting optical system 30 to pass through the lens 32 and to be reflected by the half mirror 33 by optical path switching performed by the distance measurement light path switching unit 49. The distance measurement emission light Es passes through the reflector 46, the lens 47, and is made incident to the end face 48a of the first optical fiber 48; and passes through the face 48b and is reflected by the half mirror 64; and then passes through the lens 65, and is made incident to the incident end face 66a of the second optical fiber 66; and then passes through the emitting end face 66b, the lens 67 and the lens 68, and is made incident to (the light-receiving surface 69a of) the light-receiving device 69.

Accordingly, the control calculation unit 19 measures a time difference and/or a phase difference between the distance measurement emission light Es and the distance measurement reflection light Rs based on the output signal from the light-receiving device 69, thereby measuring the distance to an object. These series of flow presents an operation of distance measurement. Accordingly, the emitting optical system 30 and the receiving optical system 60 serve as a distance measurement optical system of the distance measurement unit 13. In Embodiment 1, the reference position of the distance measurement performed by the distance measurement unit 13 (distance measurement optical system) is set to the gudgeon pin axis Ch.

In the optical distance measuring apparatus 10, the distance measurement emission light Es and the control support light Ec that are emitted from the objective lens group 41 along the irradiation light axis Li is formed as a substantially parallel light flux having a diameter dimension smaller than that of the objective lens group 41, while the visual field of the observation optical system 80 is set to have a subtended angle greater than the spread angles of the distance measurement emission light Es and the control support light Ec. Thus, as illustrated in FIG. 6, an extremely small area (see the reference symbol Im) within the visual field of the observation optical system 80 can be irradiated with the distance measurement emission light Es and the control support light Ec. In other words, in the optical distance measuring apparatus 10, the distance measurement irradiation point Im obtained by the distance measurement emission light Es and the control support light Ec can be formed in an extremely small area within the visual field of the observation optical system 80, i.e., within the image P displayed on the display unit 6. In the emitting optical system 30, the deflection unit 34 is provided on the emission light axis Le to deflect the traveling direction of the distance measurement emission light Es from the emission light axis Le, thus by adjusting the deflection unit 34 as needed, it is possible to adjust the irradiation position (the distance measurement irradiation point Im) obtained by the distance measurement emission light Es and the control support light Ec in the visual field (the image P displayed on the display unit 6) of the observation optical system 80. Hereinafter, the above operation is described.

In the optical distance measuring apparatus 10, the emitting optical system 30 is provided with the optical system for control for controlling the deflection position by the deflection unit 34. The control support light Ec emitted from the light source for control instruction 42 passes through the lens 43, and is reflected by the half mirror 33, and thus passes through the same optical path as the distance measurement emission light Es, and is reflected by the polarized light beam splitter mirror 37, then passes through the lens 44 and reaches the optical position sensor 45. Accordingly, in the optical distance measuring apparatus 10, the position of the traveling direction of the distance measurement emission light Es with respect to the emission light axis Le is set in the visual field (the image P displayed on the display unit 6) of the observation optical system 80 by adjusting the incident position of the control support light Ec with respect to the control instruction optical axis Lc in (the light-receiving surface of) the optical position sensor 45.

Figure 7:
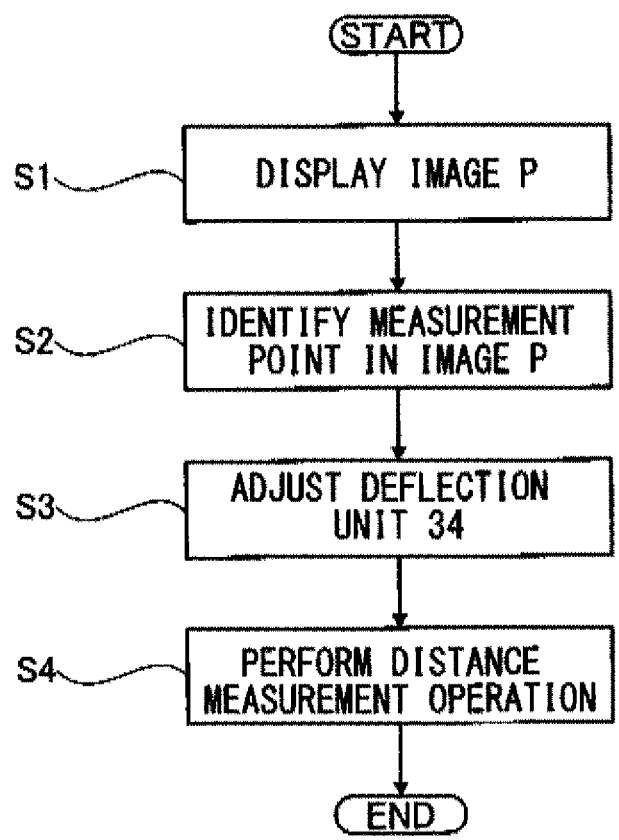
FIG. 7 is a flowchart illustrating the process of deflection position control performed by a control calculation unit 19.

FIG. 7 is a flowchart illustrating the process of deflection position control performed by the control calculation unit 19 (the control unit 18) in the present embodiment. Hereinafter, each step in the flowchart of FIG. 7 is described with reference to FIG. 6.

In step S1, the image P is displayed on the display unit 6, and the process proceeds to step S2. In step S1, acquisition of an image data by the image capturing device 82 of the observation optical system 80 is started, and the image P in accordance with an output signal from the image capturing device 82 is displayed on the display unit 6.

In step S2, subsequent to the display of the image P in step S1, the measurement point of the image P is identified, and the process proceeds to step S3. In step S2, an arbitrary point in the image P is identified as the measurement point (see the reference symbol Im in FIG. 6). In Embodiment 1, the measurement point is identified by a user designating the measurement point. The designation by a user may be made via an operation input unit 7 or direct touch on the screen of the display unit 6 which is equipped with a touch panel feature.

In step S3, subsequent to the identification of the measurement point in the image P in step S2, the deflection unit 34 is adjusted, and the process proceeds to step S4. In step S3, the deflection unit 34 is adjusted as needed (the rotation angles of the deflection device 34a and the deflection device 34b are adjusted as needed) so that the incident position of the control support light Ec with respect to the control instruction optical axis Lc in the light-receiving surface of the optical position sensor 45 is matched with the position of the measurement point identified in the image P in the optical system for control. Thus, the position of the traveling direction of the distance measurement emission light Es is set with respect to the emission light axis Le.

In step S4, subsequent to the adjustment of the deflection unit 34 in step S3, distance measurement operation is performed, and the control process of deflection position is terminated. In step S4, the distance measurement emission light Es and the distance measurement reflection light Rs are made incident to the light-receiving device 69, and based on the output signal from the light-receiving device 69, a time difference and/or a phase difference between the distance measurement emission light Es and the distance measurement reflection light Rs are measured so that the distance to the identified measurement point (see the reference symbol Im in FIG. 6) is measured. When the distance is measured, as a designated position display optical system, part of the control support light Ec which is emitted from the light source for control instruction 42 and passes through the lens 43 is reflected by the polarized light beam splitting mirror 37, and passes through the lens 44 and acquired by the optical position sensor 45. The incident position of the control support light Ec with respect to the control instruction optical axis Lc in the light-receiving surface of the optical position sensor 45 is stored in the storage unit 20 as the information of the adjustment position (the rotation angles of the deflection device 34a and the deflection device 34b) in the deflection unit 34, i.e., as the information of the position of the measurement point which is identified in the image P (in the visual field).

In the optical distance measuring apparatus 10, the process proceeds from step 51 to step S2 in the flowchart of FIG. 7, and a user designates an arbitrary position in the image P which is displayed on the display unit 6 as the measurement point by using the operation input unit 7 (display unit 6). The process then proceeds from step S3 to step S4, and the measurement point (the distance measurement irradiation point Im) in a real view can be irradiated with the distance measurement emission light Es and the control support light Ec, and the distance to the distance measurement irradiation point Im can be measured and the positional information of the distance measurement irradiation point Im can be obtained. Therefore, in optical distance measuring apparatus 10, the flowchart of FIG. 7 provides a deflection position adjustment process for adjusting the deflection position in order to measure the distance of a desired position within the visual field by the coordination between the lens-barrel portion 4, the display unit 6, and the operation input unit 7 (display unit 6) as an operation state input unit.

In the flowchart of FIG. 7, a measurement point is assumed to be identified by a user designating the measurement point on the image P displayed on the display unit 6 in step S2, however, a measurement point may be identified by image analysis, or may be predetermined, and thus is not limited to Embodiment 1. In the case where a measurement point is identified by image analysis, for example, automatic extraction of characteristic features (such as a corner angle or an edge of a building) is performed so that the characteristic features are each identified as a measurement point, or automatic extraction of previously registered objects (such as a utility pole, a bridge, a building in a specific shape) is performed so that the characteristic features are each identified as a measurement point. In the case where a measurement point is predetermined, a measurement point may be set in the visual field of the observation optical system 80, or a measurement point may be randomly identified in the visual field, or a predetermined range in the visual field may be scanned.

In the case where the above-described automatic extraction of characteristic features of an object is difficult, a user may input an element and the characteristic features can be measured by calculation. The characteristic feature for which automatic extraction is difficult includes, for example, a corner angle or an edge in a complicated form, and the center position of a three-dimensional object. Hereinafter, this point is described.

An element indicates a property of characteristic feature, for example, a surface, an edge, a corner angle (vertical angle), a sphere, a column, a cylinder, a cone, an ellipse, etc. Such elements are prepared as selectable items and are stored in the storage unit 20 (see FIG. 2). For each element, the number of measurement points necessary for extraction of the characteristic feature, and the setting condition of each measurement point for the extraction are defined in advance, and are stored in the storage unit 20 (see FIG. 2) with the above data being associated with each element. For example, in the case where an element is a corner angle (vertical angle) formed of 3 surfaces, the number and the setting condition of the measurement points are as follows: In order to calculate the vertical angle as a characteristic feature, 3 surfaces need to be identified, and to identify each surface, 3 points need to be identified, thus the number of the measurement points is 9, and the setting condition for each surface is 3. Thus, when the object O illustrated in FIG. 6 is taken as an example, in the case where a corner angle (vertical angle) which is formed of 3 surfaces is selected as an element for the object O, 3 measurement points (see the reference symbol Im) are set in a first surface Os1; 3 measurement points (see the reference symbol Im) are set in a second surface Os2; and 3 measurement points (see the reference symbol Im) are set in a third surface Os3. The setting of the measurement points may be inputted by a user, or may be made by image analysis. Then, as described above, the optical distance measuring apparatus 10 measures the distance to each measurement point (see the reference symbol Im) while adjusting the deflection position. In the control calculation unit 19, the intersections between the first surface Os1, the second surface Os2, and the third surface Os3 are calculated based on a result of the measurement (space coordinates position with respect to a measurement reference position) of each measurement point (see the reference symbol Im), and thus a vertical angle Oa of the object O as a characteristic feature can be measured.

Figure 8A:
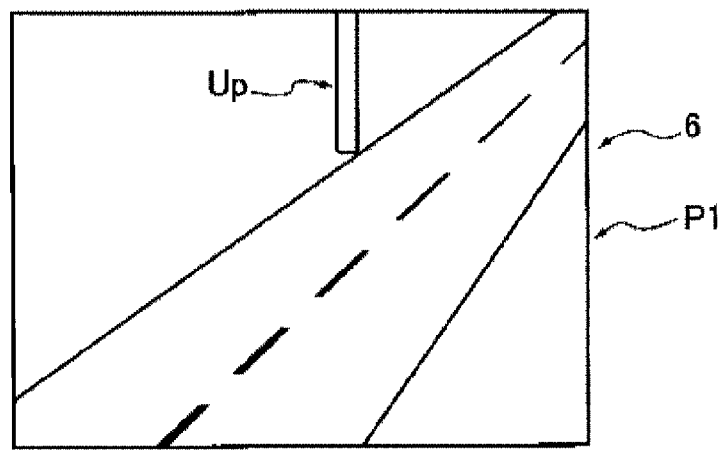
FIGS. 8A and 8C are explanatory diagrams illustrating an specific example of survey of a characteristic feature according to an input of elements, where
Figure 8B:
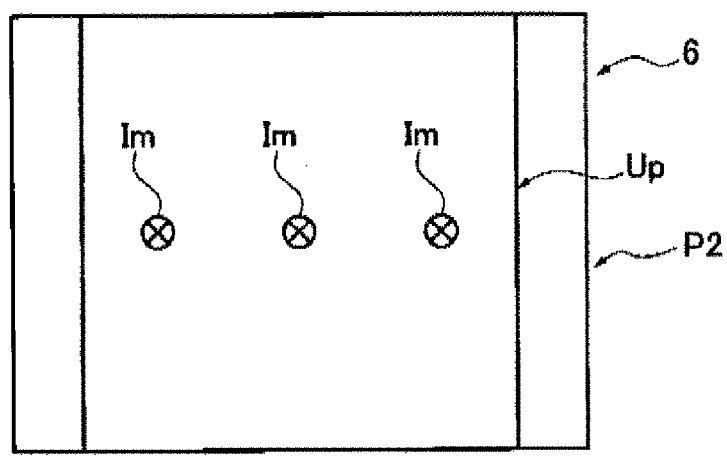
FIG. 8B illustrates how an image P2, which is acquired by a first image capturing unit 9 through a first telescope part 8, is displayed on the display unit 6.
Figure 8C:
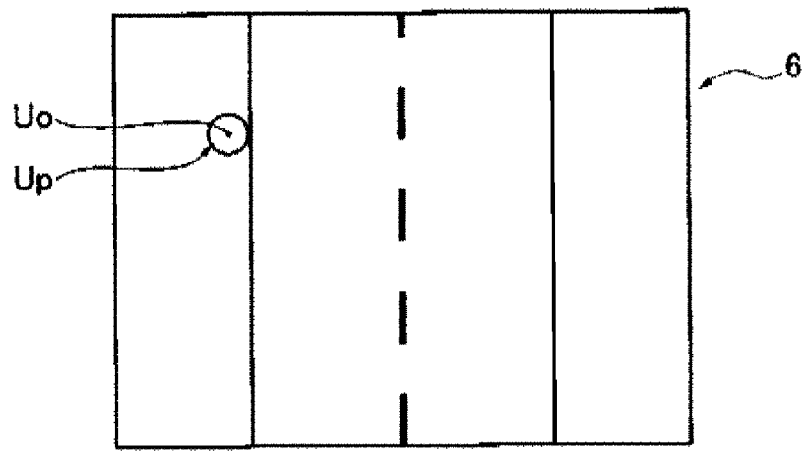

Next, a specific example of measurement of the characteristic feature using an input of the element is described with reference to FIGS. 8A to 8C. In this specific example, the position (space coordinates) of a central axis Uo (see FIG. 8C) of a utility pole Up indicated in FIGS. 8A to 8C is measured. First, the operation input unit 7 is operated by a user, and the display on the display unit 6 is assumed to be an image P1 (See FIG. 8A) acquired by the second image capturing unit 12 through the second telescope 11. In order to measure the center position (Uo) of the object of the utility pole Up in the image P1, the user selects, as an element, the column in which the characteristic feature is set as the central axis. Subsequently, the image P1 is switched to an image P2 (See FIG. 8B) which is acquired by the first image capturing unit 9 through the first telescope 8 so as to place the utility pole Up in the center. That is to say, a magnified image of the utility pole Up is displayed on display unit 6 as the image P2, the magnified image being acquired by the collimation optical system which shares the distance measurement unit 13 (see FIG. 2) and the optical system. The switching of the image (telescope (image capturing unit)) may be performed by a user designating the utility pole Up (and the peripheral position) in the image P1, or may be performed by an image analysis of the image P1. Then, because the selected element is a column and the characteristic feature is set as the central axis, the number of measurement points is 3, and the setting condition is that the measurement points are located at different positions when viewed in a direction perpendicular to the center axis. Accordingly, as illustrated in FIG. 8B, 3 measurement points (see the reference symbol Im) are set at different positions in the utility pole Up when viewed in the horizontal direction. The setting of each measurement point may be made by a user input or by an image analysis. Then, as described above, the optical distance measuring apparatus 10 measures the distance to each measurement point (see the reference symbol Im) while adjusting the deflection position. In the control calculation unit 19, the center position (central axis Uo (see FIG. 8C)) for 3 measurement points on the surface of the utility pole Up (see the reference symbol Im), i.e., 3 points located on the same circumference are calculated based on a result of the measurement (space coordinates) of each measurement point (see the reference symbol Im), and thus the position (space coordinates) of the central axis Uo of the utility pole Up as a characteristic feature can be measured.

In this manner, in the optical distance measuring apparatus 10 according to the present invention, the deflection unit 34 provided on the emission light axis Le of the emitting optical system 30 enables the deflection position (the direction and the degree of inclination with respect to the irradiation light axis Li of the distance measurement emission light Es) of the distance measurement emission light Es to be adjusted. Thus, a desired position can be irradiated with the distance measurement emission light Es, and the distance to the desired position can be measured without causing the collimation direction to be changed.

In addition, in the optical distance measuring apparatus 10, the center position 34*q* of the deflection device 34*b*, which is the position where the deflection position of the distance measurement emission light Es is set by the deflection unit 34, is arranged to have a optically conjugate relationship with the emitting position E on the irradiation light axis Li sharing the same emission light axis Le in the emitting optical system 30. In the viewpoint of setting the direction and the degree of inclination with respect to the irradiation light axis Li, the substantial emitting position of the distance measurement emission light Es emitted from the objective lens group 41 can be the emitting position E. Accordingly, by adjusting the deflection position of the distance measurement emission light Es with the deflection unit 34, the traveling direction of the distance measurement emission light Es actually emitted from the objective lens group 41 can be set, and thus the distance to a desired position can be measured.

Furthermore, in the optical distance measuring apparatus 10, a degree of inclination around two orthogonal axes in a plane perpendicular to the emission light axis Le is adjusted by the deflection unit 34 including a pair of the deflection device 34a and the deflection device 34b, and the center position 34p of the deflection device 34a and the center position 34q of the deflection device 34b have an optically conjugate relationship, and the center position 34q of the deflection device 34b, and the emitting position E on the irradiation light axis Li have an optically conjugate relationship. In the viewpoint of setting the direction and the degree of inclination with respect to the irradiation light axis Li, the substantial emitting position of the distance measurement emission light Es emitted from the objective lens group 41 can be the emitting position E. Accordingly, by adjusting the rotational attitude of the deflection device 34a and the deflection device 34b, the traveling direction of the distance measurement emission light Es actually emitted from the objective lens group 41 can be set, and thus the distance to a desired position can be measured.

In the optical distance measuring apparatus 10, the emitting position E on the irradiation light axis Li can be substantial emitting position in the viewpoint of setting the direction and the degree of inclination with respect to the irradiation light axis Li, thus the substantial emitting position (emitting unit) can be reduced in size.

In the optical distance measuring apparatus 10, the position where the direction and the degree of inclination with respect to the irradiation light axis Li are actually set, and the substantial emitting position can be spaced apart, thus the flexibility of the optical configuration can be improved, and the size of the entire apparatus can be reduced.

In the optical distance measuring apparatus 10, the deflection unit 34 changes a degree of inclination around one axis (y-axis) parallel a plane perpendicular to the emission light axis Le using the deflection device 34a, while changing a degree of inclination around the other axis (x-axis) orthogonal to the one axis parallel a plane perpendicular to the emission light axis Le using the deflection device 34b. Thus, for a displacement in one direction (also referred to as the x-axis direction), only deflection device 34a should be adjusted, while for a displacement in the other direction (also referred to as the y-axis direction), only deflection device 34b should be adjusted, thus adjustment control for formation of the distance measurement irradiation point Im as a desired position can be made easy.

In the optical distance measuring apparatus 10, the deflection device 34a and the deflection device 34b as the deflection unit 34 are formed of an MEMS mirror, thereby allowing an extremely small configuration, and extremely high adjustment accuracy in the deflection position of the distance measurement emission light Es can be obtained, and the speed of the adjustment can be significantly increased.

In the optical distance measuring apparatus 10, the position of the traveling direction of the distance measurement emission light Es with respect to the emission light axis Le can be set within the visual field of the observation optical system 80, thus a measurement point can be set based on visual recognition using the observation optical system 80, and therefore a desired position can be easily identified.

In the optical distance measuring apparatus 10, a measurement point can be set in the image P displayed on the display unit 6, the position of the traveling direction of the distance measurement emission light Es can be set with respect to the emission light axis Le based on the measurement point in the image P, thus the distance to a desired position can be easily measured.

In the optical distance measuring apparatus 10, the emitting optical system 30 is provided with the optical system for control for controlling the deflection position by the deflection unit 34. The control support light Ec emitted from the light source for control instruction 42 passes through the lens 43, and is reflected by the half mirror 33, and thus passes through the same optical path as the distance measurement emission light Es, and is reflected by the polarized light beam splitter mirror 37, then passes through the lens 44 and reaches the optical position sensor 45. Thus, the position of the traveling direction of the distance measurement emission light Es with respect to the emission light axis Le is set in the visual field of the observation optical system 80 by adjusting the incident position of the control support light Ec with respect to the control instruction optical axis Lc in (the light-receiving surface of) the optical position sensor 45.

In the optical distance measuring apparatus 10, the emitting optical system 30 is provided with an designated position display optical system which designates a position of distance measurement. The control support light Ec emitted from the light source for control instruction 42 passes through the lens 43, and is reflected by the half mirror 33, and thus passes through the same optical path as the distance measurement emission light Es, and is emitted together with the distance measurement emission light Es, from the objective lens group 41 on the irradiation light axis Li. Therefore, an irradiation spot (the distance measurement irradiation point Im) can be formed by irradiating a point with the control support light Ec which can be visually recognized, the point being the same as the position which is irradiated with the distance measurement emission light Es for which the deflection position has been adjusted by the deflection unit 34. Accordingly, the user can easily check whether or not the distance to a position matched to the identified measurement point is being measured. In other words, by using the irradiation spot, a measurement point in an actual scene can be reliably identified.

In the optical distance measuring apparatus 10, the deflection position of the distance measurement emission light Es can be adjusted by the deflection unit 34, thus power consumption can be reduced by using the adjustment of the deflection position with high priority. This is because the following reason. For example, an object is assumed to be a prism held by a worker or a prism provided in a civil engineering machine, and automatic tracking is performed in accordance with the position of the object using a tracking optical system. In this case, when the survey site has a gentle inclination, the prism as an object basically significantly move in the horizontal direction, however, the prism only slightly moves up and down in the vertical direction accompanying the horizontal movement. For this reason, in the case where automatic tracking is performed in such a condition, the collimation direction is changed in the horizontal direction in accordance with the movement of the prism (object), whereas only the adjustment of the deflection position is made by the deflection unit 34 in the vertical direction, and thus the movement of the prism can be coped with. Consequently, the vertical drive unit 16 is not necessary to be operated in the automatic tracking, thus power consumption can be reduced. In addition, in this case, a displacement of the prism (object) in the vertical direction is coped with only the adjustment of the deflection position made by the deflection unit 34, thus even when the vertical up and down motion of the prism occurs at an extremely short interval, proper tracking can be made, and the accuracy in the automatic tracking can be improved.

Consequently, the optical distance measuring apparatus 10 according to the present invention enables the distance to a desired position to be measured without causing the collimation direction to be changed.

Figure 9:
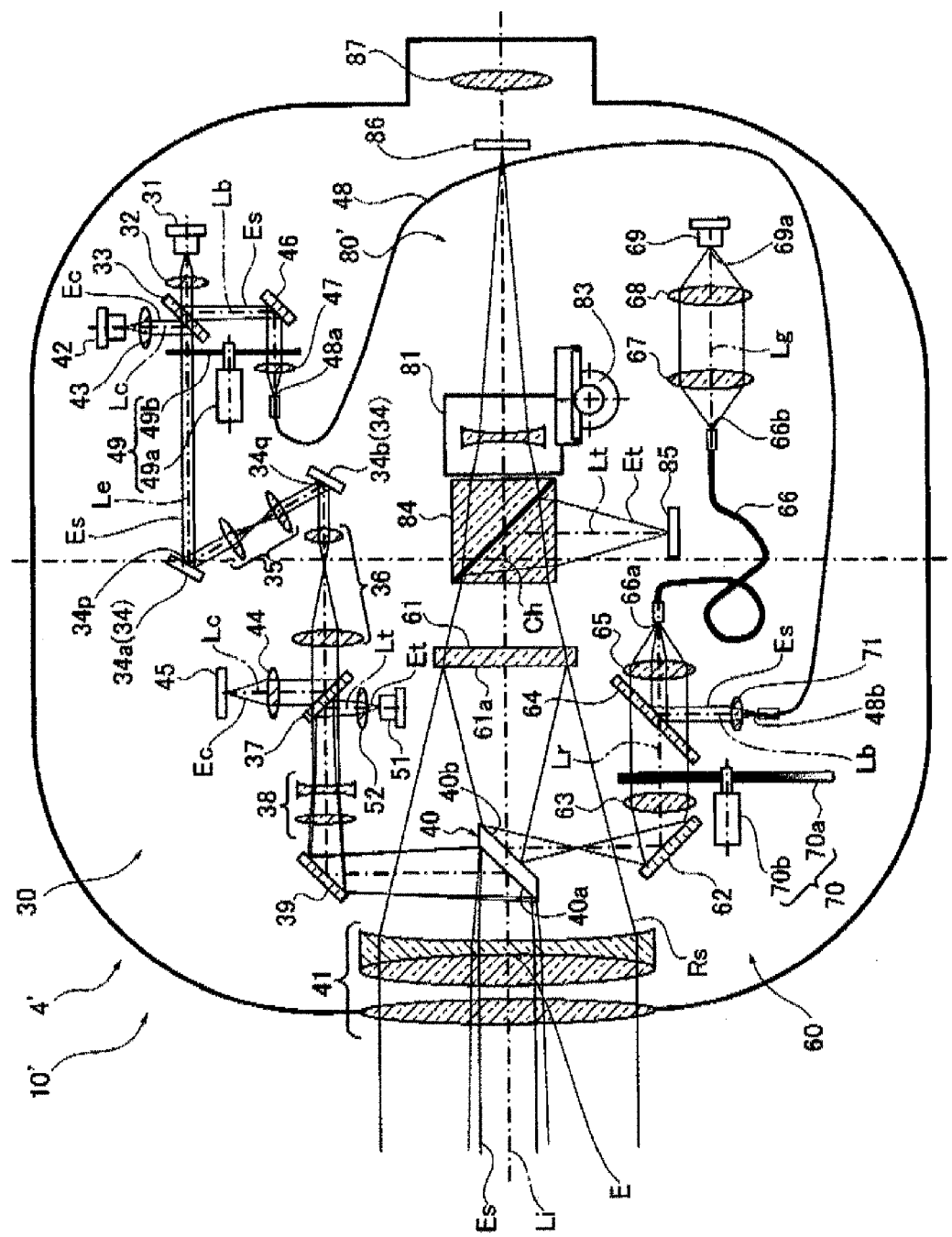
FIG. 9 is an explanatory diagram similar to FIG. 3, which illustrates the optical configuration of an optical distance measuring apparatus 10' as another example of Embodiment 1.

In Embodiment 1, the observation optical system 80 uses the image-forming lens 81 to form an image on the capturing device 82, and the image P according to an output signal from the capturing device 82 is displayed on the display unit 6. However, as illustrated in FIG. 9, the observation optical system 80 may have a configuration such that a user directly looks into a telescope. An optical distance measuring apparatus 10' includes a sight unit 86 and an ocular lens 87 instead of the image capturing device 82. The sight unit 86, which is not shown, forms a line of sight in a visual field, and the ocular lens 87 allows a user to visually recognize a scene which passes through the optical system of the observation optical system 80. Although illustration is omitted, in the observation optical system 80 in FIG. 3, the optical path on the side of the image capturing device 82 with respect to the image-forming lens 81 is branched, and one of the optical paths is directed to form an image on the image capturing device 82, while the other optical path is directed to the sight unit 86 and the ocular lens 87 as illustrated in FIG. 9.

In Embodiment 1, control process illustrated in the flowchart in FIG. 7 is performed to adjust the deflection position, however, the deflection position should be only adjusted by the deflection unit 34 based on the position designated on the image P displayed by the display unit 6 so as to measure the distance to the designated position, and the invention is not limited to Embodiment 1.

[Embodiment 2]

Next, an optical distance measuring apparatus 10A according to Embodiment 2 of the present invention is described with reference to FIGS. 10 to 13. Embodiment 2 is an example in which the optical distance measuring apparatus 10 in Embodiment 1 includes irradiation area switching device configured to switch to allow the distance measurement emission light Es and the control support light Ec to be emitted as an expanded light flux from the objective lens group 41, or to be emitted as a substantially parallel light flux. The optical distance measuring apparatus 10A in Embodiment 2 has a basic configuration substantially similar to that of the above-described optical distance measuring apparatus 10 in Embodiment 1, thus the portions having the same configuration as in Embodiment 1 are labeled with the same reference symbols, and detailed description is omitted.

Figure 10:
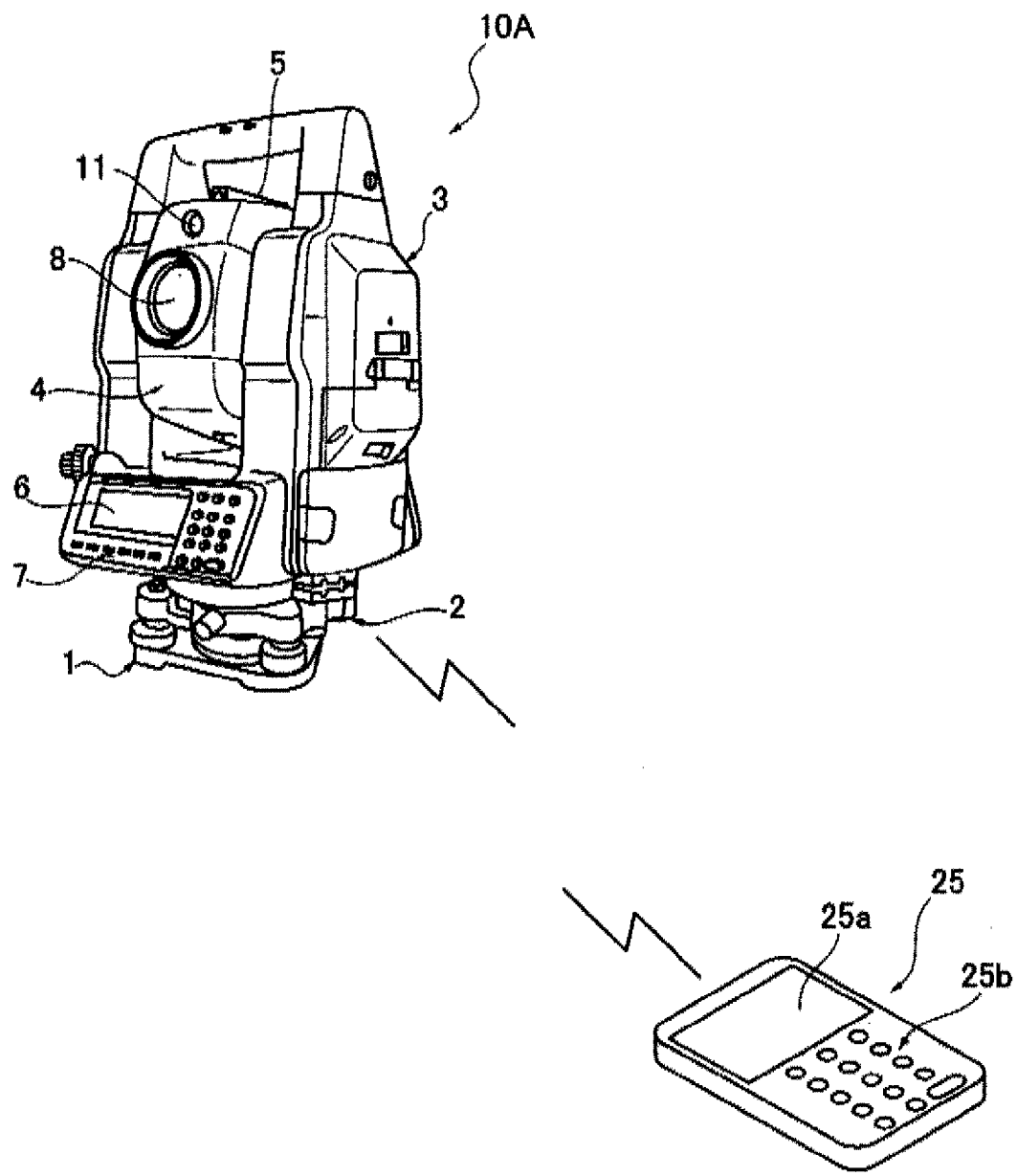
FIG. 10 is a perspective view schematically illustrating an optical distance measuring apparatus 10A of Embodiment 2 and a remote controller 26 for the optical distance measuring apparatus 10A.

As illustrated in FIG. 10, the optical distance measuring apparatus 10A in Embodiment 2 allows remote control performed by a remote controller 25. The optical distance measuring apparatus 10A is provided with a communication unit 24 (see two-dot chain line in FIG. 2). The communication unit 24 enables wireless communication of data between the control calculation unit 19 and (a control calculation unit of) the remote controller 25 via a communication unit in the remote controller 25 (not shown).

The remote controller 25 has a display unit 25a and an operation input unit 25b. Under the control of the control calculation unit (not shown) of the remote controller 25, the display unit 25a can display information similar to that of the display unit 6. Similarly to the operation input unit 7, the operation input unit 25b is an operation unit for utilizing various functions of the optical distance measuring apparatus 10A, and outputs inputted information to the control calculation unit (not shown) of the remote controller 25. The control calculation unit transmits operation information, which is directed to the operation input unit 25b, to the control calculation unit 19 (see FIG. 2) via a communication unit (not shown) in the remote controller 25 and the communication unit 24. Accordingly, the optical distance measuring apparatus 10A allows display of various pieces of information by the display unit 6 and an operation with the operation input unit 7, and further allows display of various pieces of information by the display unit 25a of the remote controller 25, and operation with the operation input unit 25b.

Figure 11:
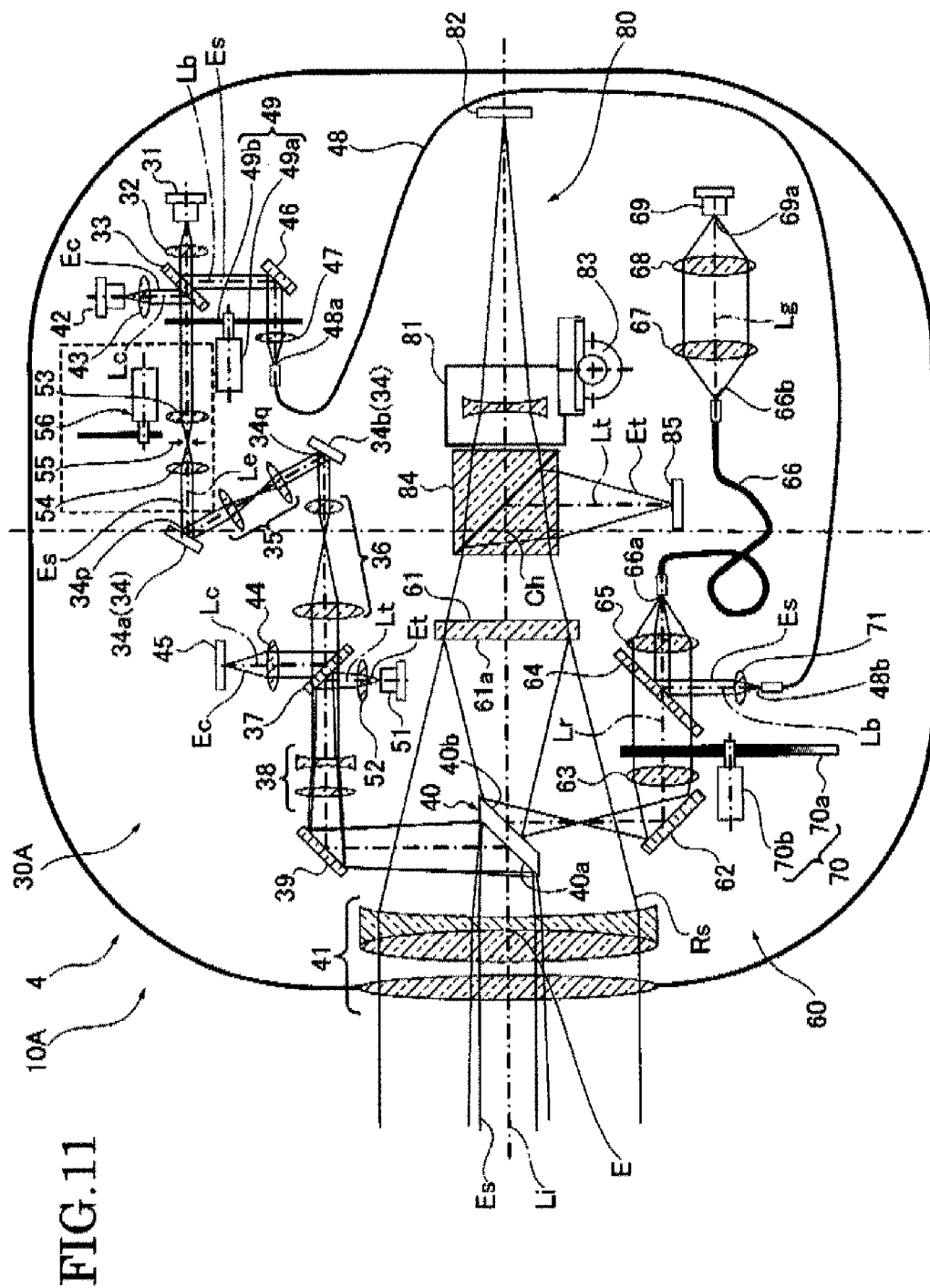
FIG. 11 is an explanatory diagram similar to FIG. 3, which illustrates the optical configuration of the optical distance measuring apparatus 10A of Embodiment 2.
Figure 12A:
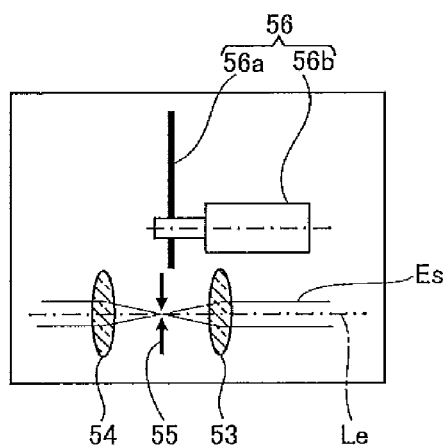
FIG. 12A is an explanatory diagram illustrating an enlarged view of a portion surrounded by a two-dot chain line of FIG. 11 and illustrates a state in which a diffuser unit 56a is not placed on a reflection light axis Lr.
Figure 12B:
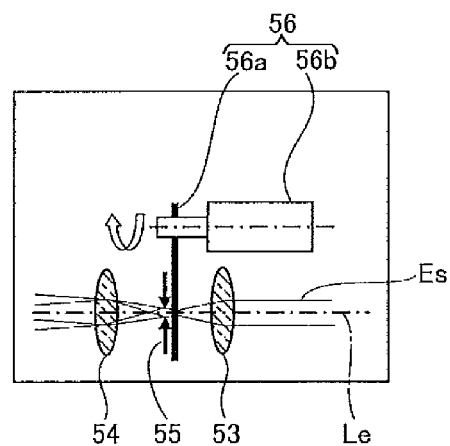
FIG. 12B is an explanatory diagram illustrating an enlarged view of a portion surrounded by a two-dot chain line of FIG. 11 and illustrates a state in which a diffuser unit 56a is placed on the reflection light axis Lr.

As illustrated in FIGS. 11 and 12, in the optical distance measuring apparatus 10A, the emitting optical system 30A includes, as the irradiation area switching device, a lens 53, a lens 54, and an aperture 55 on the emission light axis Le between the half mirror 33 and the deflection unit 34, and further includes a diffuser device 56 related to the above units. The lens 53 and lens 54 are each is provided with the aperture 55 at the focal position, form a telecentric optical system which allows the parallel light flux (the distance measurement emission light Es) passing through the half mirror 33 to pass through respective foci and to direct again as a parallel light flux to the deflection unit 34 ((the reflection plane of) the deflection device 34a).

The diffuser device 56 has a diffuser unit 56a which presents a tabular, and a motor 56b configured to rotate the diffuser unit 56a. The diffuser unit 56a is a diffusing optical member configured to diffuse incident light flux while allowing the light flux to transmit. The diffuser device 56 is provided with the diffuser unit 56a at a location on the side of the lens 53 with respect to the aperture 55, the location allowing the diffuser unit 56a to come in-and-out on the emission light axis Le. By driving the motor 56b under the control of the control calculation unit 19, the diffuser unit 56a is placed as needed on the emission light axis Le.

In the emitting optical system 30A, when the diffuser unit 56a is not inserted on the emission light axis Le (see FIG. 12A), similar effects to those of the emitting optical system 30 in Embodiment 1, i.e., the optical distance measuring apparatus 10 are obtained. In other words, the distance measurement irradiation point Im (hereinafter, the small distance measurement irradiation point is also referred to as a reduced distance measurement irradiation point Imn (see FIG. 13A)) obtained by the distance measurement emission light Es and the control support light Ec can be formed in an extremely small area within the image P displayed in the visual field, i.e., the display unit 6 of the observation optical system 80, or in the display unit 25a of the remote controller 25.

On the other hand, when the diffuser unit 56a is not inserted on the emission light axis Le (see FIG. 12B), the distance measurement emission light Es focused by the lens 53 is diffused by the diffuser unit 56a before reaching the focal position of the lens 53. However, because the aperture 55 is provided on the side of the lens 54 with respect to the diffuser unit 56a, a spread angle of the distance measurement emission light Es which is directed to the lens 54 can be set by the aperture 55 (inner diameter dimension) and the position of the diffuser unit 56a on the emission light axis Le. That is to say, the distance measurement irradiation point Im (hereinafter, the large distance measurement irradiation point is also referred to as a reduced distance measurement irradiation point Ime (see FIG. 13A)) obtained by the distance measurement emission light Es and the control support light Ec can be formed in an area within the image P displayed in the visual field, i.e., the display unit 6 of the observation optical system 80, or in the display unit 25a of the remote controller 25, the area being larger than the reduced distance measurement irradiation point Imn.

Figure 13A:
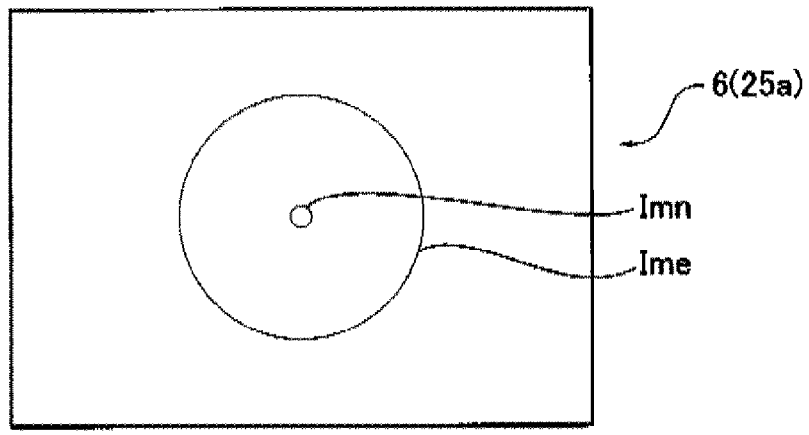
FIG. 13A is an explanatory diagram illustrating an specific example of survey in which an enlarged distance measurement irradiation point Ime is used and illustrates the relationship between the dimensions of a reduced distance measurement irradiation point Imn and the enlarged distance measurement irradiation point Ime in the display of the display unit 6.
Figure 13B:
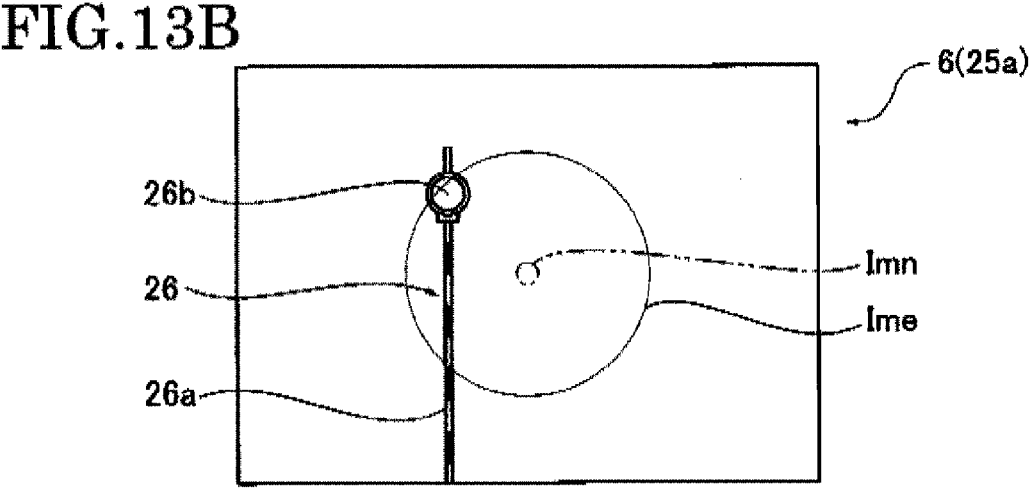
FIG. 13B is an explanatory diagram illustrating an specific example of survey in which an enlarged distance measurement irradiation point Ime is used and illustrates a state in which the collimation direction is substantially directed toward a survey tool 26.
Figure 13C:
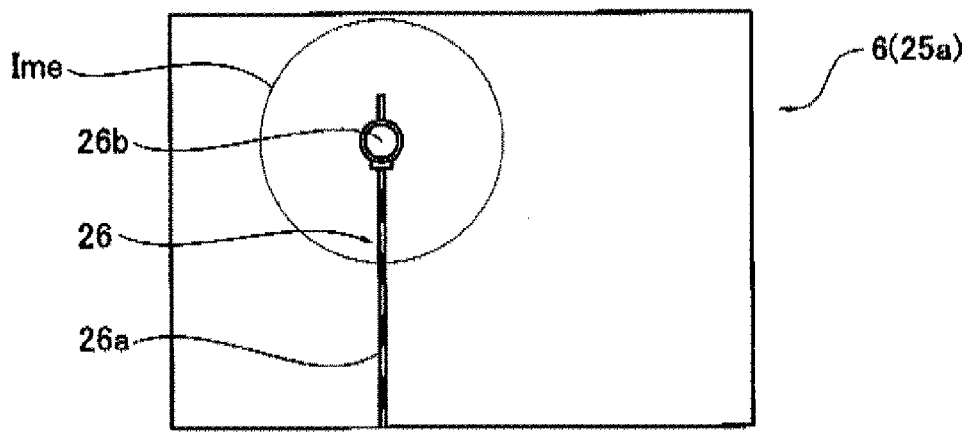
FIG. 13C is an explanatory diagram illustrating an specific example of survey in which an enlarged distance measurement irradiation point Ime is used and illustrates a state of deflection position in accordance with the position of a prism 26b in the same collimation direction as in FIG. 13B.

Next, in the optical distance measuring apparatus 10A, a specific example of distance measurement in a state where the diffuser unit 56a is inserted on the emission light axis Le is described with reference to FIGS. 13A to 13C. In the description, in the visual field, i.e., the display unit 6 of the observation optical system 80, or in the display unit 25a of the remote controller 25, the reduced distance measurement irradiation point Imn and the enlarged distance measurement irradiation point Ime that are switchable are assumed to have the relationship as illustrated in FIG. 13A.

In this specific example, prism distance measurement is performed using the survey tool 26. As illustrated in FIGS. 13B and 13C, the survey tool 26 has a configuration in which a pole 26a is provided with a prism 26b. A worker switches from the reduced distance measurement irradiation point Imn to the enlarged distance measurement irradiation point Ime (see FIG. 13A) to perform the prism distance measurement. Subsequently, the collimation direction is changed so as to direct to the survey tool 26 (see FIG. 13B). As described later, at this step, it is not necessary to precisely direct the collimation direction to the survey tool 26. As illustrated in FIG. 13B, the distance measurement emission light Es is emitted as an enlarged light flux in the changed collimation direction, and the enlarged distance measurement irradiation point Ime is formed within the visual field (display by the display unit 6 (display unit 25a)) of the observation optical system 80. Here, it is assumed that only a portion of the prism 26b is located in the enlarged distance measurement irradiation point Ime. Part of the distance measurement reflection light Rs from the prism 26b passes through the mirror 61 and the beam splitter 84, and can be acquired by the tracking area CCD 85. Therefore, the control calculation unit 19 (see FIG. 2) can identify the incident position of the distance measurement reflection light Rs on the light-receiving surface, i.e., the position of the prism 26b within the visual field (display by the display unit 6) of the observation optical system 80 based on the output signal from the tracking area CCD 85. The control calculation unit 19 (see FIG. 2) then adjusts the deflection unit 34 as needed (adjusts the rotation angles of the deflection device 34a and the deflection device 34b as needed) based on the identified position so as to set the position of the traveling direction of the distance measurement emission light Es with respect to the emission light axis Le. By emitting the distance measurement emission light Es as an enlarged light flux in the deflection position, the enlarged distance measurement irradiation point Ime can be formed so that the prism 26b is located at the center as illustrated in FIG. 13C. Accordingly, the distance measurement reflection light Rs from the prism 26b can be acquired more appropriately, thus the distance to the prism 26b can be measured more appropriately. At this point, by taking information of the collimation direction and information of the deflection position of the deflection unit 34 into consideration, the position (space coordinates position with respect to the measurement reference position) of the prism 26b can be accurately acquired.

The optical distance measuring apparatus 10A in Embodiment 2 basically has a similar configuration to that of the optical distance measuring apparatus 10 in Embodiment 1, thus similar effects to those of Embodiment 1 can be obtained basically.

In addition, in the optical distance measuring apparatus 10A in Embodiment 2, by inserting the diffuser unit 56a of the diffuser device 56 on the emission light axis Le, the distance measurement emission light Es and the control support light Ec that are emitted from the objective lens group 41 on the irradiation light axis Li can be formed into an enlarged light flux. Then the dimension of the area in the object which is irradiated with the distance measurement emission light Es and the control support light Ec, i.e., the irradiation spot (the enlarged distance measurement irradiation point Ime) which is formed on the object becomes greater than the dimension of the irradiation spot (the reduction range irradiation point Imn) which is formed by the distance measurement emission light Es and the control support light Ec that are emitted as a parallel light flux without inserting the diffuser unit 56a. Accordingly, the diameter dimension of the distance measurement emission light Es and the control support light Ec that are emitted from the objective lens group 41 can be switched as needed, thus the dimension of the irradiation spot (the distance measurement irradiation point Im) which is formed on the object can be switched as needed. Thus, as described above, a desired position can be irradiated with the distance measurement emission light Es, and the distance to the desired position can be measured without causing the collimation direction to be changed. The area as the desired position (measurement point) for performing distance measurement can be changed regardless of the change of the collimation direction.

In addition, in the optical distance measuring apparatus 10A in Embodiment 2, the distance measurement emission light Es and the control support light Ec that are emitted from the objective lens group 41 on the irradiation light axis Li can be formed into diffused light by inserting the diffuser unit 56a of the diffuser device 56 on the emission light axis Le, thus the dimension of the irradiation spot formed on the object can be changed (see the reduced distance measurement irradiation point Imn and the enlarged distance measurement irradiation point Ime).

Furthermore, in the optical distance measuring apparatus 10A in Embodiment 2, the spread angle (the dimension of the enlarged distance measurement irradiation point Ime) of the control support light Ec emitted as an enlarged light flux from the objective lens group 41 can be set on the irradiation light axis Li by the aperture 55 (inner diameter dimension) and the position of the diffuser unit 56a on the emission light axis Le. Therefore, for example, by setting the spread angle of the control support light Ec to be substantially equal to the visual field (see the image P in FIG. 6) of the observation optical system 80, tracking can be performed by using the control support light Ec, and thus the light source for tracking 51 and the lens 52 are no longer in use and can be eliminated. Consequently, the optical distance measuring apparatus 10A may be reduced in size.

In the optical distance measuring apparatus 10A in Embodiment 2, like the above-described specific example of prism distance measurement, the distance to an object can be accurately measured by substantially directing the collimation direction toward the object to be measured (the prism 26b (the survey tool 26) in the specific example). Accordingly, measuring work can be made much simpler, and the time spent for the measuring work can be significantly reduced.

In the optical distance measuring apparatus 10A in Embodiment 2, measuring work can be performed even at a remote place while viewing an image acquired (captured) by the first image capturing unit 9 or the second image capturing unit 12 by using the remote controller 25.

Consequently, the optical distance measuring apparatus 10A according to the present invention enables the distance to a desired position to be measured without causing the collimation direction to be changed.

The above-described Embodiment 2 includes the lens 53, the lens 54, the aperture 55, and the diffuser device 56, as the irradiation area switching device, however, the area in the object (the dimension of the irradiation spot (the distance measurement irradiation point Im) formed on the object (the reduced distance measurement irradiation point Imn and the enlarged distance measurement irradiation point Ime)) which is irradiated with the distance measurement emission light Es and the control support light Ec should be only switchable, and the invention is not limited to the above-described Embodiment 2. Hereinafter, other embodiments of the irradiation area switching device are each described as a modification. Because other embodiments of the irradiation area switching device which are applied to the optical distance measuring apparatus according to the invention are described in the following modifications, the basic configuration is described using the optical distance measuring apparatus 10 in Embodiment 1 or the optical distance measuring apparatus 10A in Embodiment 2, and the portion having the same configuration is labeled with the same reference symbol and detailed description is omitted.

[Modification 1]

Figure 14:
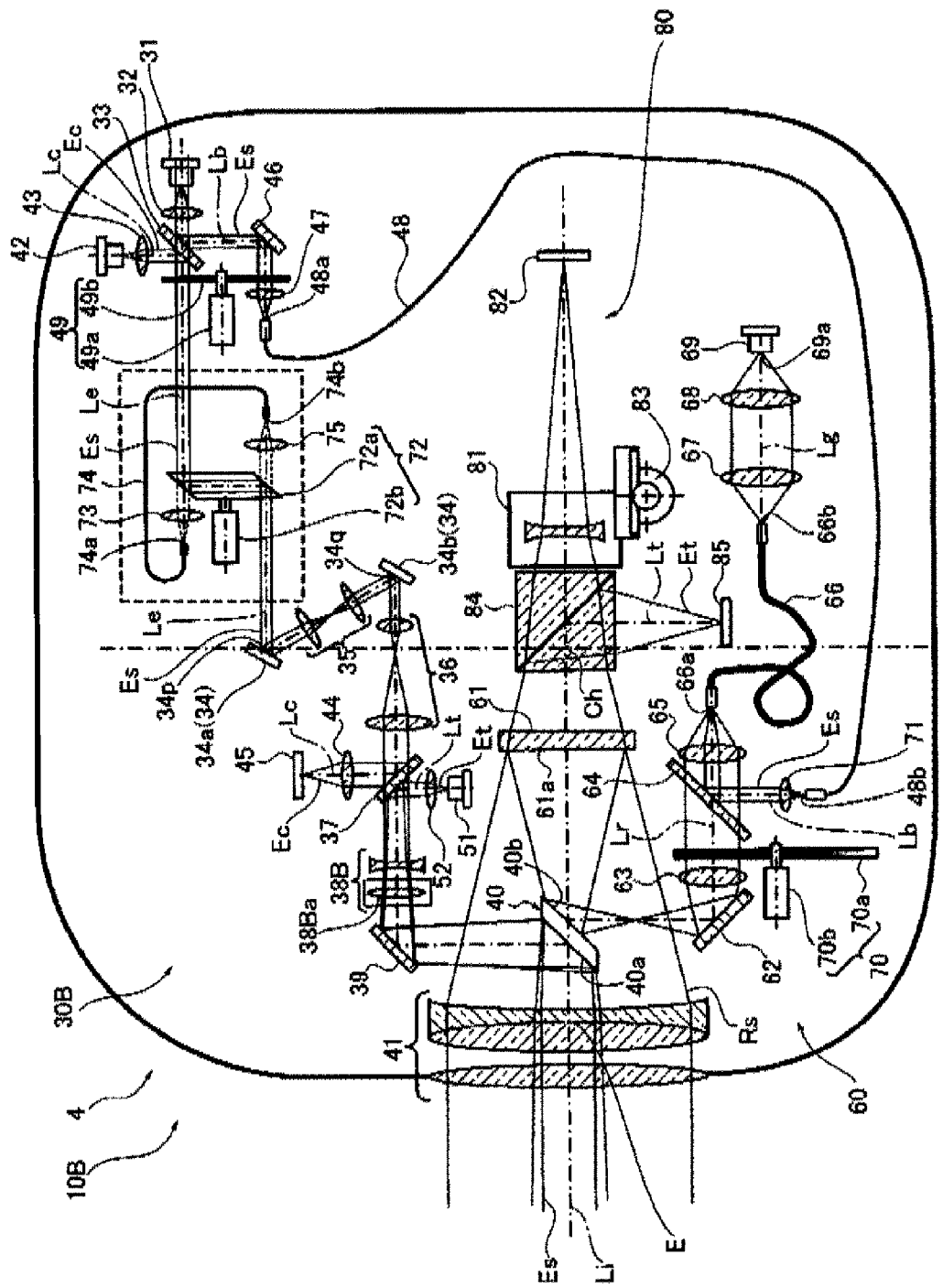
FIG. 14 is an explanatory diagram similar to FIG. 3, which illustrates the optical configuration of an optical distance measuring apparatus 10B in Modification 1 of Embodiment 2.

As illustrated in FIGS. 14 and 15, in the optical distance measuring apparatus 10B in Modification 1, an emitting optical system 30B includes, as an irradiation area switching device, an optical path switching device 72, a lens 73, a third optical fiber 74 and a lens 75 that are between the half mirror 33 and the deflection units 34. The optical path switching device 72 has a prism unit 72a and a motor 72b to rotate the prism unit 72a. The prism unit 72a is formed of a prism which presents generally pillar-shaped. The prism unit 72a has a flat incident plane 72c, a first reflection plane 72d which faces the incident plane 72c with an inclined angle of 45°, a second reflection plane 72e parallel to the incident plane 72c, and a flat emission plane 72f which faces the second reflection plane 72e with an inclined angle of 45°, and is parallel to the incident plane 72c.

In the emitting optical system 30B, the emission light axis Le is set to be shifted in parallel in the emission light path from the half mirror 33 to the deflection unit 34. The optical path switching device 72 can arrange the incident plane 72c of the prism unit 72a so as to be on and perpendicular to the emission light axis Le which has passed through the half mirror 33, while arranging the emission plane 72f of the prism unit 72a so as to be on and perpendicular to the emission light axis Le which reaches the deflection unit 34. The emission light axis Le which has passed through the half mirror 33 is provided with the lens 73 which focuses incident parallel light flux (the distance measurement emission light Es and the control support light Ec) into an incident end face 74a provided at one end of the third optical fiber 74 on the emission light axis Le. In addition, an emitting end face 74b provided at the other end of the third optical fiber 74 is provided on the emission light axis Le which reaches the deflection unit 34, and a parallel light flux emitted from the emitting end face 74b passes through the lens 75 along the emission light axis Le so as to be directed to the deflection unit 34 (the deflection device 34a). By driving the motor 72b under the control of the control calculation unit 19, the optical path switching device 72 can dispose the prism unit 72a on the emission light axis Le as needed.

In the emitting optical system 30B, one lens 38Ba in the lens group 38B which is provided between the polarized light beam splitting mirror 37 and the reflector 39 is formed of a liquid lens. Under the control of the control calculation unit 19, the lens 38Ba (not shown) allows adjustment of the width dimension, i.e., the focal length.

Figure 15A:
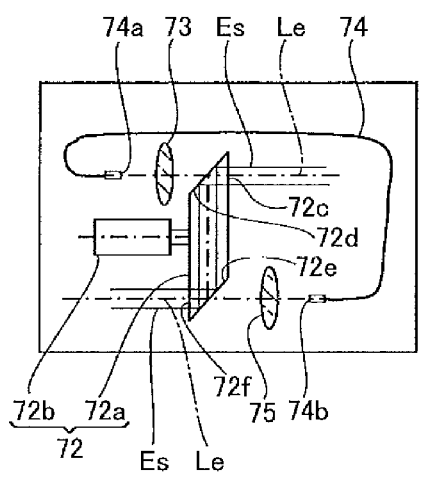
FIGS. 15A and 15B are explanatory diagrams illustrating an enlarged view of a portion surrounded by a two-dot chain line of FIGS. 12A and 12B, where

Therefore, in the emitting optical system 30B, the prism unit 72a, when being disposed on the emission light axis Le, forms an emission light path. That is to say, as illustrated in FIG. 15A, part of the parallel light flux (the distance measurement emission light Es and the control support light Ec) which has passed through the half mirror 33 is incident to the prism unit 72a from the incident plane 72c, and is reflected by the first reflection plane 72d in the prism unit 72a, and is directed to the second reflection plane 72e to be reflected by the second reflection plane 72e, and is emitted from the emission plane 72f, and is guided along the emission light axis Le toward the deflection unit 34 (the deflection device 34a). In this state, similar effects to those of the emitting optical system 30 in Embodiment 1, i.e., the optical distance measuring apparatus 10 are obtained.

Figure 15B:
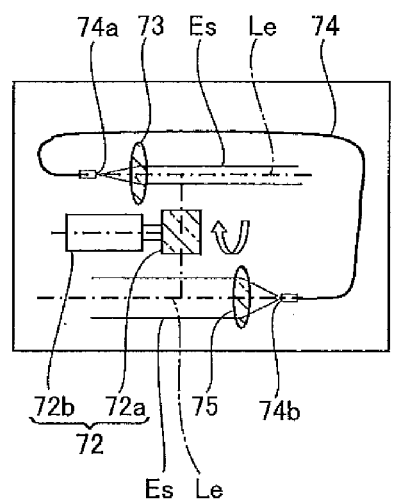

In the emitting optical system 30B, when the prism unit 72a is removed from the emission light axis Le, the lens 73, the third optical fiber 74, and the lens 75 form a emission light path. That is to say, part of the parallel light flux (the distance measurement emission light Es and the control support light Ec) which has passed through the half mirror 33 is focused on the incident end face 74a of the third optical fiber 74 by the lens 73 as illustrated in FIG. 15B, and is diffused while traveling inside the third optical fiber 74, and is emitted from the emitting end face 74b. The light flux emitted from the emitting end face 74b passes through the lens 75, and is guided along the emission light axis Le toward the deflection unit 34 (the deflection device 34a). Here, the distance measurement emission light Es and the control support light Ec which have passed through the third optical fiber 74 are emitted from the objective lens group 41 along the irradiation light axis Li, and the beam diameter and spread angle of the light Es and Ec at the emission from the objective lens group 41 can be set as needed by the diameter dimension of the third optical fiber 74 and the setting of the lens 75. In Modification 1, the lens 75 collimates the light flux emitted from the emitting end face 74b into a flux of light parallel to the emission light axis Le and having a diameter dimension greater than the diameter dimension (the diameter dimension set by the lens 32) of the distance measurement emission light Es and the control support light Ec which have passed through the prism unit 72a. In this state, similar effects to those of the emitting optical system 30A in Embodiment 2, i.e., the optical distance measuring apparatus 10A in a state where the diffuser unit 56a is inserted on the emission light axis Le are obtained. Therefore, the third optical fiber 74 serves as a diffusing optical member which allows incident light flux to pass therethrough while diffusing the incident light flux.

Furthermore, in the emitting optical system 30B, regardless of the switching state of the irradiation area switching device, the spread angle of the distance measurement emission light Es and the control support light Ec that are emitted from the objective lens group 41 can be adjusted as needed by changing the focal length of the lens 38Ba of the lens group 38B as needed.

[Modification 2]

Figure 16:
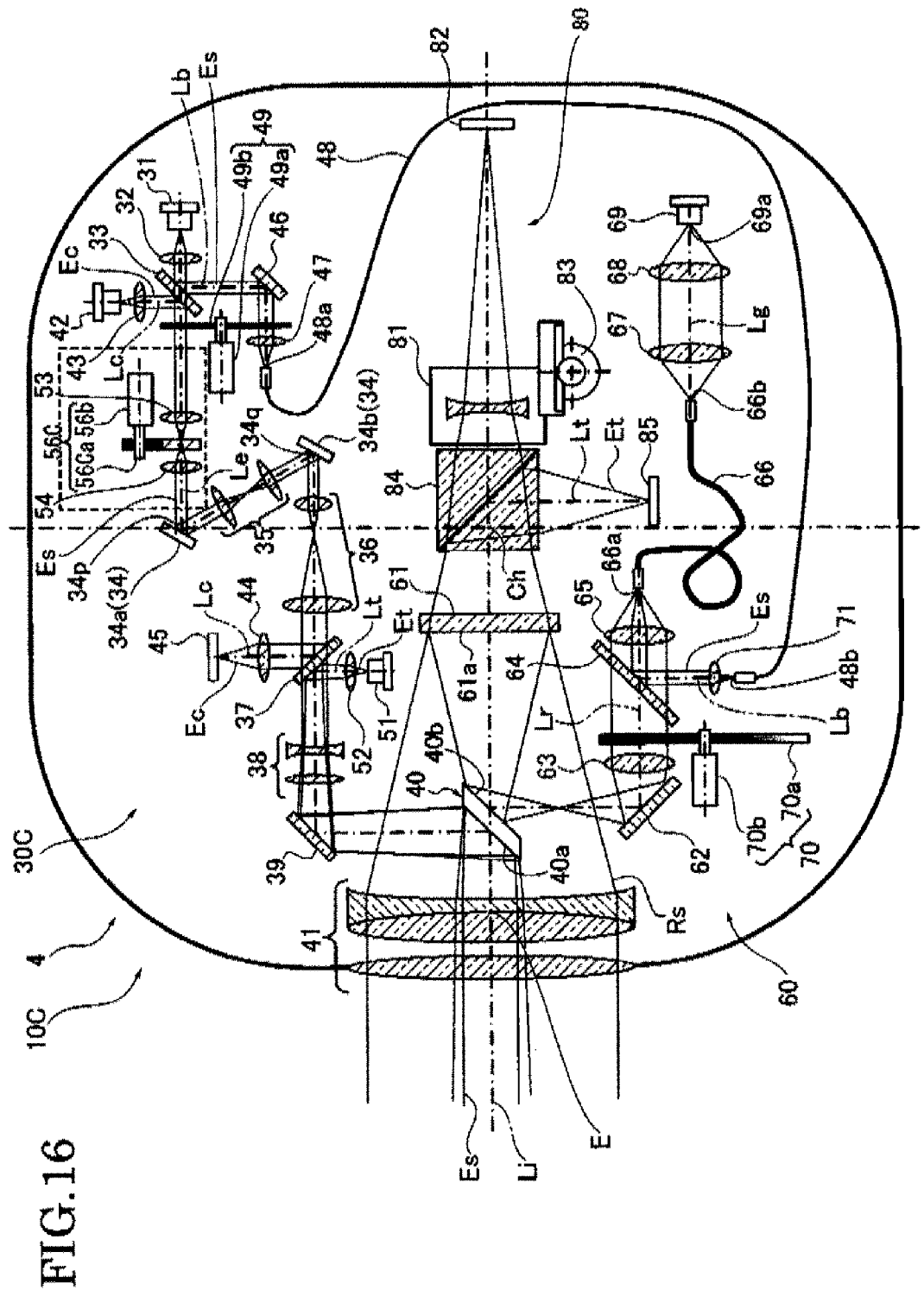
FIG. 16 is an explanatory diagram similar to FIG. 3, which illustrates the optical configuration of an optical distance measuring apparatus 10C in Modification 2 of Embodiment 2.

An optical distance measuring apparatus 10C in Modification 2 is an example having the same configuration as the optical distance measuring apparatus 10A in Embodiment 2 except for the diffuser device 56 of the irradiation area switching device in the optical distance measuring apparatus 10A. In the optical distance measuring apparatus 10C, as illustrated in FIG. 16, in an emitting optical system 30C, the diffuser device 56C as the irradiation area switching device has a parallel plate glass unit 56Ca which presents a tabular, and the motor 56b configured to rotate the parallel plate glass unit 56Ca. The parallel plate glass unit 56Ca is a plate member composed of a glass material which allows incident light flux to pass therethrough. In the diffuser device 56C, the parallel plate glass unit 56Ca is provided at a location allowing the parallel plate glass unit 56Ca to come in-and-out on the emission light axis Le at a portion where a parallel light flux is not formed on the emission light path. In Modification 2, the parallel plate glass unit 56Ca is provided at a location to allow itself to come in-and-out between the lens 53 and the lens 54. Similarly to the optical distance measuring apparatus 10A, by driving the motor 56b under the control of the control calculation unit 19, the diffuser device 56C disposes the parallel plate glass unit 56Ca on the emission light axis Le as needed. In the emitting optical system 30C, when the parallel plate glass unit 56Ca is located on the emission light axis Le, the spread angle of the light flux which reaches the deflection unit 34 (the deflection device 34a) can be changed by the refractive action of the parallel plate glass unit 56Ca. Accordingly, the spread angle of the distance measurement emission light Es and the control support light Ec that are emitted from the objective lens group 41 can be switched as needed. Therefore, similarly to the optical distance measuring apparatus 10A in Embodiment 2, by setting the spread angle of the control support light Ec to be substantially equal to the visual field (see the image P in FIG. 6) of the observation optical system 80, tracking can be performed by using the control support light Ec, and thus the light source for tracking 51 and the lens 52 are no longer in use and can be eliminated. Thus, the parallel plate glass unit 56Ca serves as a refractive optical member which allows incident light flux to pass therethrough while changing the spread angle of the incident light flux.

[Modification 3]

Figure 17:
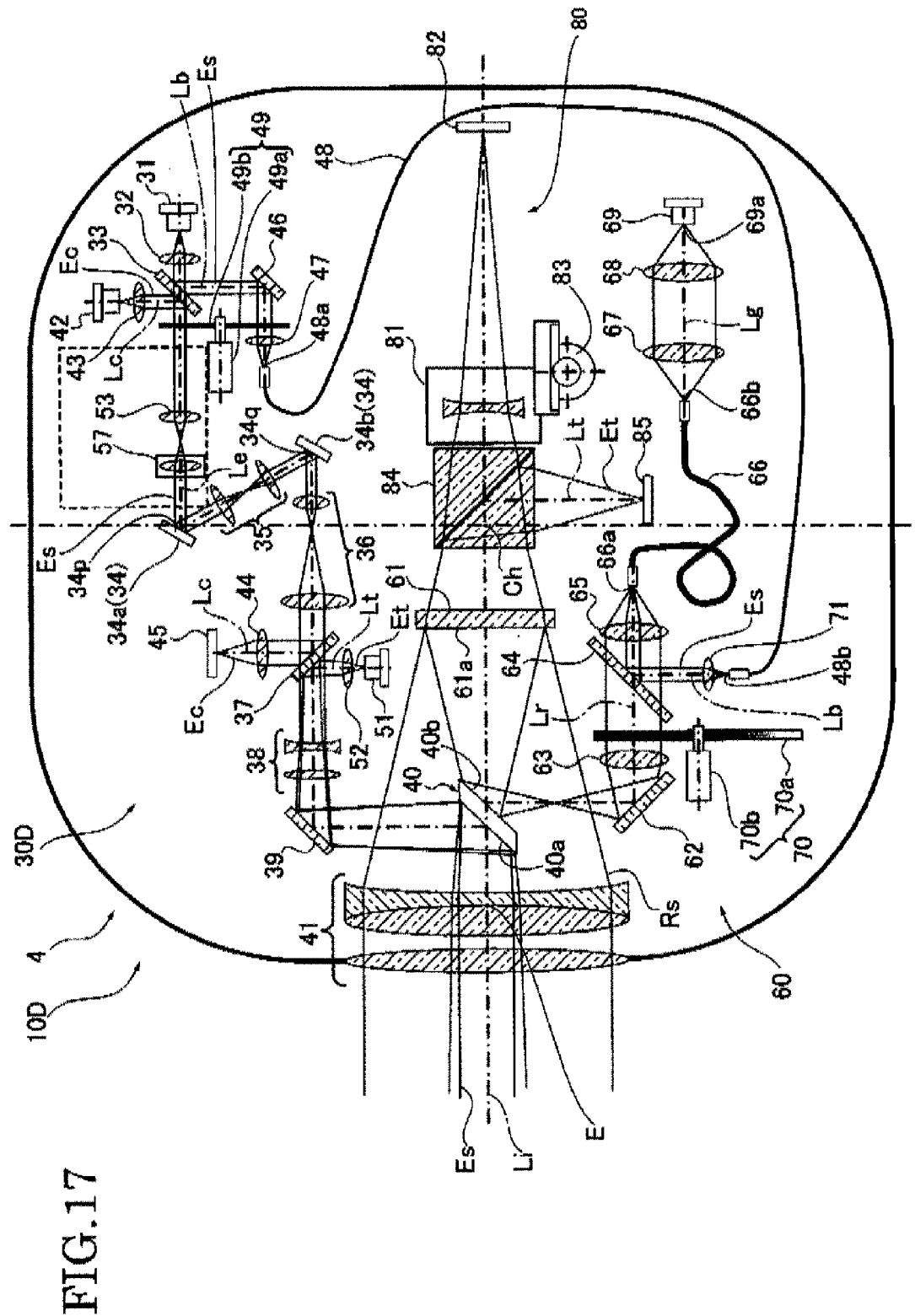
FIG. 17 is an explanatory diagram similar to FIG. 3, which illustrates the optical configuration of an optical distance measuring apparatus 10D of Modification 3 of Embodiment 2.

An optical distance measuring apparatus 10D in Modification 3 is an example having the same configuration as the optical distance measuring apparatus 10A in Embodiment 2 except for the irradiation area switching device in the optical distance measuring apparatus 10A. As illustrated in FIG. 17, in the optical distance measuring apparatus 10D, an emitting optical system 30D includes a lens 53 and a liquid lens 57 as the irradiation area switching device. That is to say, compared with the optical distance measuring apparatus 10A (see FIG. 11), the lens 54 is replaced by the liquid lens 57, and no diffuser device 56 is provided. The liquid lens 57 is provided between the lens 53 and the deflection unit 34 (the deflection device 34a) on the emission light axis Le, and under the control of the control calculation unit 19, the liquid lens 57 (not shown) allows adjustment of the width dimension, i.e., the focal length. In the emitting optical system 30D, similar effects to those of the optical distance measuring apparatus 10 in Embodiment 1 can be obtained by setting the focal length of the liquid lens 57 to be substantially equal to that of the lens 54 (see FIG. 3) in the optical distance measuring apparatus 10 of Embodiment 1. In addition, in the emitting optical system 30D, the spread angle of the distance measurement emission light Es and the control support light Ec that are emitted from the objective lens group 41 can be changed as needed by changing the focal length of the liquid lens 57 as needed. Thus, the liquid lens 57 serves as a refractive optical member which allows incident light flux to pass therethrough while changing the spread angle of the incident light flux.

Therefore, similarly to the optical distance measuring apparatus 10A in Embodiment 2, by setting the spread angle of the control support light Ec to be substantially equal to the visual field (see the image P in FIG. 6) of the observation optical system 80, tracking can be performed by using the control support light Ec, and thus the light source for tracking 51 and the lens 52 are no longer in use and can be eliminated.

In addition, in the optical distance measuring apparatus 10D of modification 3, the spread angle of the distance measurement emission light Es and the control support light Ec that are emitted from the objective lens group 41 can be changed as needed, thus spot light having a dimension suitable to an object can be formed in accordance with the size of the object and the distance to the object. Consequently, the distance to the object can be more appropriately measured, and automatic tracking of the object can be more properly performed.

[Modification 4]

Figure 18:
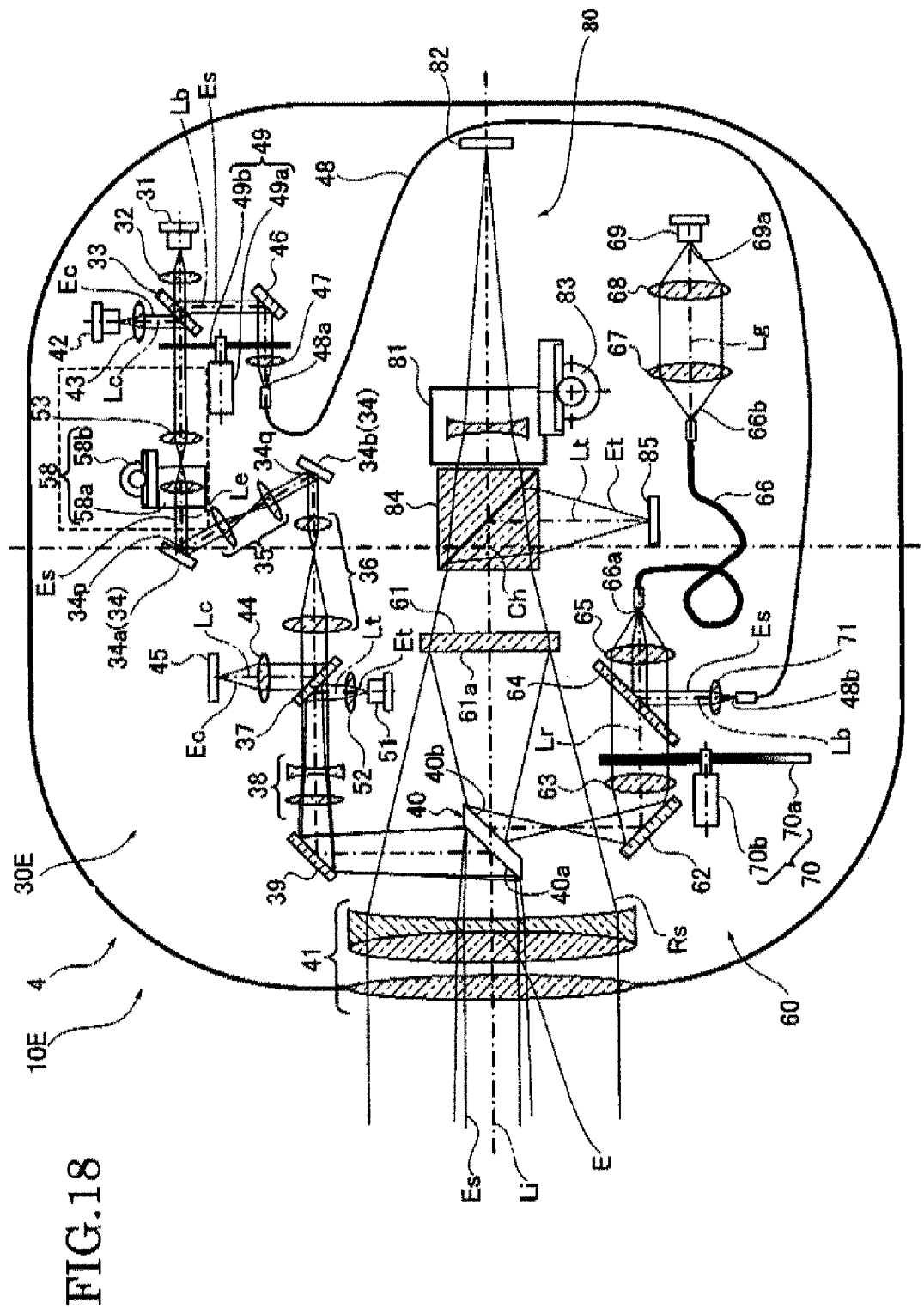
FIG. 18 is an explanatory diagram similar to FIG. 3, which illustrates the optical configuration of an optical distance measuring apparatus 10E in Modification 4 of Embodiment 2.

An optical distance measuring apparatus 10E in Modification 4 is an example having the same configuration as the optical distance measuring apparatus 10A in Embodiment 2 except for the irradiation area switching device in the optical distance measuring apparatus 10A. As illustrated in FIG. 18, in the optical distance measuring apparatus 10E, an emitting optical system 30E includes a lens 53 and a lens drive mechanism 58 as the irradiation area switching device. That is to say, compared with the optical distance measuring apparatus 10A (see FIG. 11), the lens 54 is replaced by the lens drive mechanism 58, and no diffuser device 56 is provided. The lens drive mechanism 58 has a lens unit 58a provided on the emission light axis Le between the lens 53 and the deflection unit 34 (the deflection device 34a), and a drive unit 58b configured to move the lens unit 58a in the direction to the emission light axis Le. The lens unit 58a is a lens similar to the lens 54 of the optical distance measuring apparatus 10A, and forms a telecentric optical system with the coordination of the lens 53 when the lens unit 58a is disposed at a reference position. The drive unit 58b is formed such that the output axis of a motor is provided with a pinion, and the pinion is engaged with a rack provided in the lens unit 58a. In the lens drive mechanism 58, by driving the drive unit 58b under the control of the control calculation unit 19, the lens unit 58a can be moved along the emission light axis Le as needed. In the emitting optical system 30E, the effects similar to those of the optical distance measuring apparatus 10 in Embodiment 1 can be obtained by disposing the lens unit 58a at the reference position. In addition, in the emitting optical system 30E, the spread angle of the distance measurement emission light Es and the control support light Ec that are emitted from the objective lens group 41 can be changed as needed by changing the position of the lens unit 58a on the emission light axis Le as needed. Therefore, similarly to the optical distance measuring apparatus 10A in Embodiment 2, by setting the spread angle of the control support light Ec to be substantially equal to the visual field (see the image P in FIG. 6) of the observation optical system 80, tracking can be performed by using the control support light Ec, and thus the light source for tracking 51 and the lens 52 are no longer in use and can be eliminated. Thus, the lens drive mechanism 58 serves as a refractive optical member which allows incident light flux to pass therethrough while changing the spread angle of the incident light flux.

[Embodiment 3]

Next, an optical distance measuring apparatus 10F according to Embodiment 3 of the present invention is described with reference to FIG. 19. Embodiment 3 is an example having the same configuration as the optical distance measuring apparatus 10A in Embodiment 2 except for the emitting optical system in the optical distance measuring apparatus 10A. The optical distance measuring apparatus 10F in Embodiment 3 has a basic configuration substantially similar to that of the above-described optical distance measuring apparatus 10A in Embodiment 2, thus the portions having the same configuration as in Embodiment 2 are labeled with the same reference symbols, and detailed description is omitted.

Figure 19:
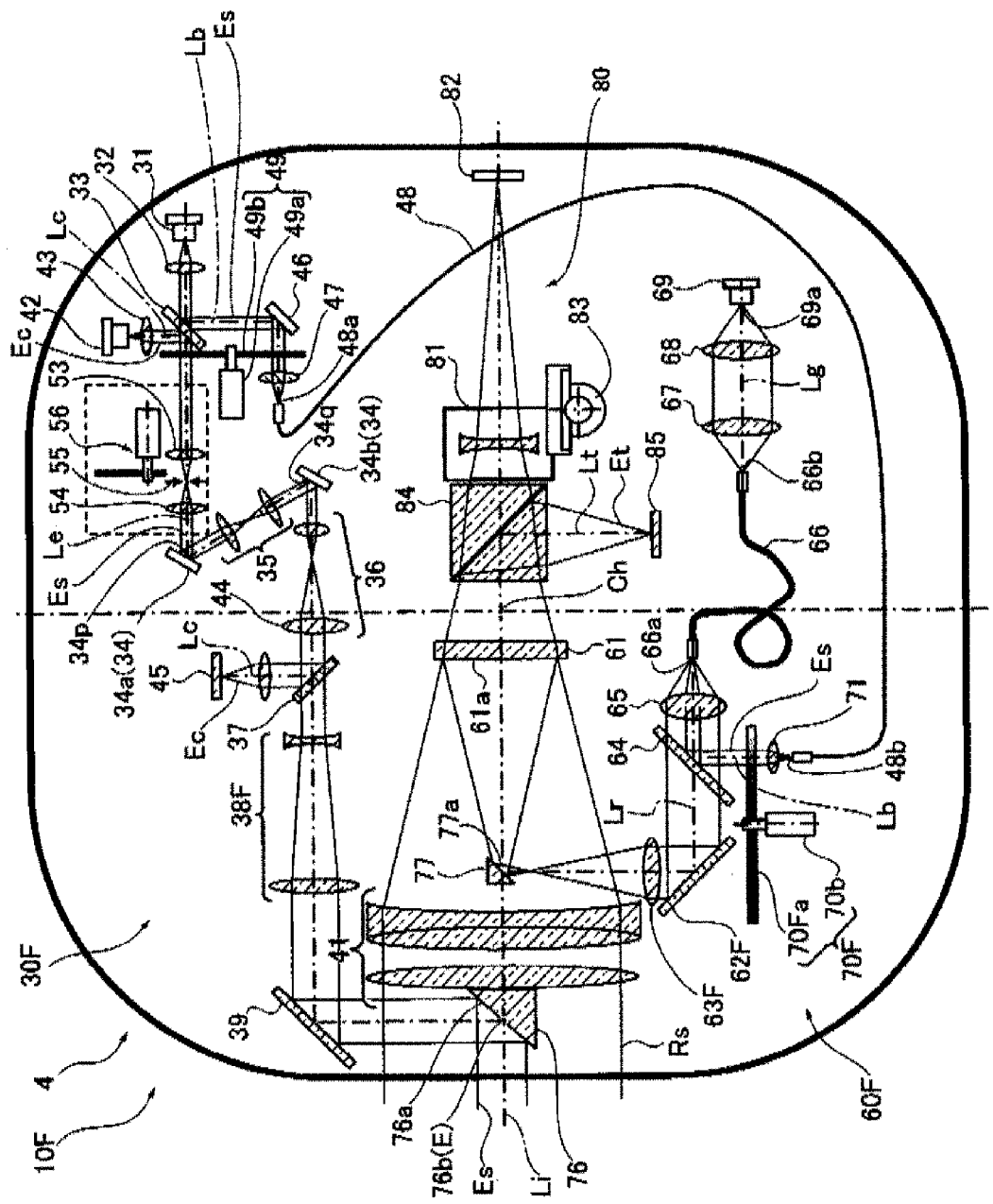
FIG. 19 is an explanatory diagram similar to FIG. 3, which illustrates the optical configuration of an optical distance measuring apparatus 10F of Embodiment 3.

As illustrated in FIG. 19, in the optical distance measuring apparatus 10F in Embodiment 3, a reflection unit 76 is provided outwardly of the objective lens group 41 (on the side of an object, and is opposite side to the mirror 61 on the irradiation light axis Li) on the irradiation light axis Li in an emitting optical system 30F, and a reflection unit 77 is provided on the side of the mirror 61 with respect to the objective lens group 41 on the irradiation light axis Li in the receiving optical system 60F. That is to say, compared with the optical distance measuring apparatus 10A (see FIG. 11), the double sided mirror 40 is replaced by the reflection unit 76 and the reflection unit 77. The reflection unit 76 and the reflection unit 77 form a reflection plane 76a and a reflection plane 77a, respectively, and are formed of a triangular prism in Embodiment 3. In contrast to the optical distance measuring apparatus 10A (see FIG. 11), in the receiving optical system 60F, a reflector 62F is provided behind a lens 63F in the reflection light path, and an ND filter device 70F is provided so that the ND filter device 70F allows part of an ND filter unit 70Fa to be located between a lens 71 and a half mirror 64 on the branched emission light axis Lb.

In the emitting optical system 30F, the reflector 39 is provided so as to reflect the light flux (the distance measurement emission light Es and the control support light Ec) toward the reflection plane 76a of the reflection unit 76, the light flux having passed through a lens group 38F. The reflection unit 76 (the reflection plane 76a) reflects the light flux reflected by the reflector 39 to outwardly (the object side) on the irradiation light axis Li. In this manner, in the emitting optical system 30F, the light flux (the distance measurement emission light Es and the control support light Ec) which has passed through the lens group 38F is emitted without passing through the objective lens group 41, thus the lens group 38F is set to emit the parallel light flux (the distance measurement emission light Es and the control support light Ec) which has passed through the polarized light beam splitting mirror 37 as a substantially parallel light flux with a changed diameter dimension. The diameter dimension which is set by the lens group 38F is assumed to be smaller than the diameter dimension of the objective lens group 41. Accordingly, the reflection plane 76a of the reflection unit 76 has the function similar to that of the first reflection plane 40a of the double sided mirror 40 in the optical distance measuring apparatus 10A. In the emitting optical system 30F, the center position 76b on the irradiation light axis Li (emission light axis Le) in the reflection plane 76a of the reflection unit 76, and the center position 34q on the emission light axis Le in the reflection plane of the deflection device 34b are arranged to have an optically conjugate relationship. Accordingly, in emitting optical system 30F, the center position 76b of the reflection plane 76a of the reflection unit 76 can be substantial emitting position of the distance measurement emission light Es (accurately speaking, which is emitted from a frontward position of the objective lens group 41 without passing through the objective lens group 41) which is emitted from the objective lens group 41.

In the receiving optical system 60F, the mirror 61 is provided so as to reflect reduced light flux (the distance measurement reflection light Rs) with an decreasing beam diameter along the objective lens group 41, toward the reflection plane 77a of the reflection unit 77. The reflection unit 77 (the reflection plane 77a) reflects the light flux (the distance measurement reflection light Rs) reflected by the reflector 39, on the reflection light axis Lr toward the lens 63F. The lens 63F forms the light flux reflected by (the reflection plane 77a of) the reflection unit 77 into a light flux parallel to the reflection light axis Lr, and the distance measurement reflection light Rs formed into the parallel flux is reflected on reflection-light axis Lr by the reflector 62F toward to the half mirror 64.

Furthermore, in the receiving optical system 60F, the ND filter unit 70Fa is provided so as to be able to be located between the lens 71 and the half mirror 64 on the branched emission light axis Lb, the ND filter unit 70Fa being a filter member whose transmission quantity gradually varies in accordance with the angular position from the reference point. Thus by driving the motor 70b under the control of the control calculation unit 19, the quantity of light incident to the lens 65, i.e., (the light-receiving surface 69a of) the light-receiving device 69 is adjusted by the distance measurement emission light Es which is emitted from the emitting end face 48b of the first optical fiber 48 onto the branched emission light axis Lb and has passed through lens 71.

In the optical distance measuring apparatus 10F in Embodiment 3, when the diffuser unit 56a of the diffuser device 56 is inserted on the emission light axis Le in the emitting optical system 30F, the spread angle of the control support light Ec emitted as an enlarged light flux from the objective lens group 41 on the irradiation light axis Li is set to be substantially equal to the visual field (see the image P in FIG. 6) of the observation optical system 80. Accordingly, the light source for tracking 51 and the lens 52 in the optical distance measuring apparatus 10A are not provided, and tracking is performed by using the control support light Ec.

The optical distance measuring apparatus 10F in Embodiment 3 basically has a similar configuration to that of the optical distance measuring apparatus 10A in Embodiment 2, thus similar effects to those of Embodiment 2 can be obtained basically.

In addition, in the optical distance measuring apparatus 10F in Embodiment 3, the distance measurement emission light Es and the control support light Ec can be emitted without passing through the objective lens group 41 in the emitting optical system 30F, and substantial emitting position of the light Es, Ec can be set to the center position 76b of the reflection plane 76a of the reflection unit 76 which is provided outwardly of the objective lens group 41 on the irradiation light axis Li. Thus, the deflection position (the direction and the degree of inclination with respect to the irradiation light axis Li) is adjusted and a change in the optical path length can be prevented, therefore, the deflection position of the distance measurement emission light Es and the control support light Ec can be more appropriately adjusted by the deflection unit 34.

Consequently, the optical distance measuring apparatus 10F according to the present invention enables the distance to a desired position to be measured without causing the collimation direction to be changed.

[Embodiment 4]

Next, an optical distance measuring apparatus 10G according to Embodiment 4 of the present invention is described with reference to FIG. 20. Embodiment 4 is an example having the same configuration as the optical distance measuring apparatus 10A in Embodiment 2 except for the deflection unit in the optical distance measuring apparatus 10A. The optical distance measuring apparatus 10G in Embodiment 4 has a basic configuration substantially similar to that of the above-described optical distance measuring apparatus 10A in Embodiment 2, thus the portions having the same configuration as in Embodiment 2 are labeled with the same reference symbols, and detailed description is omitted.

Figure 20:
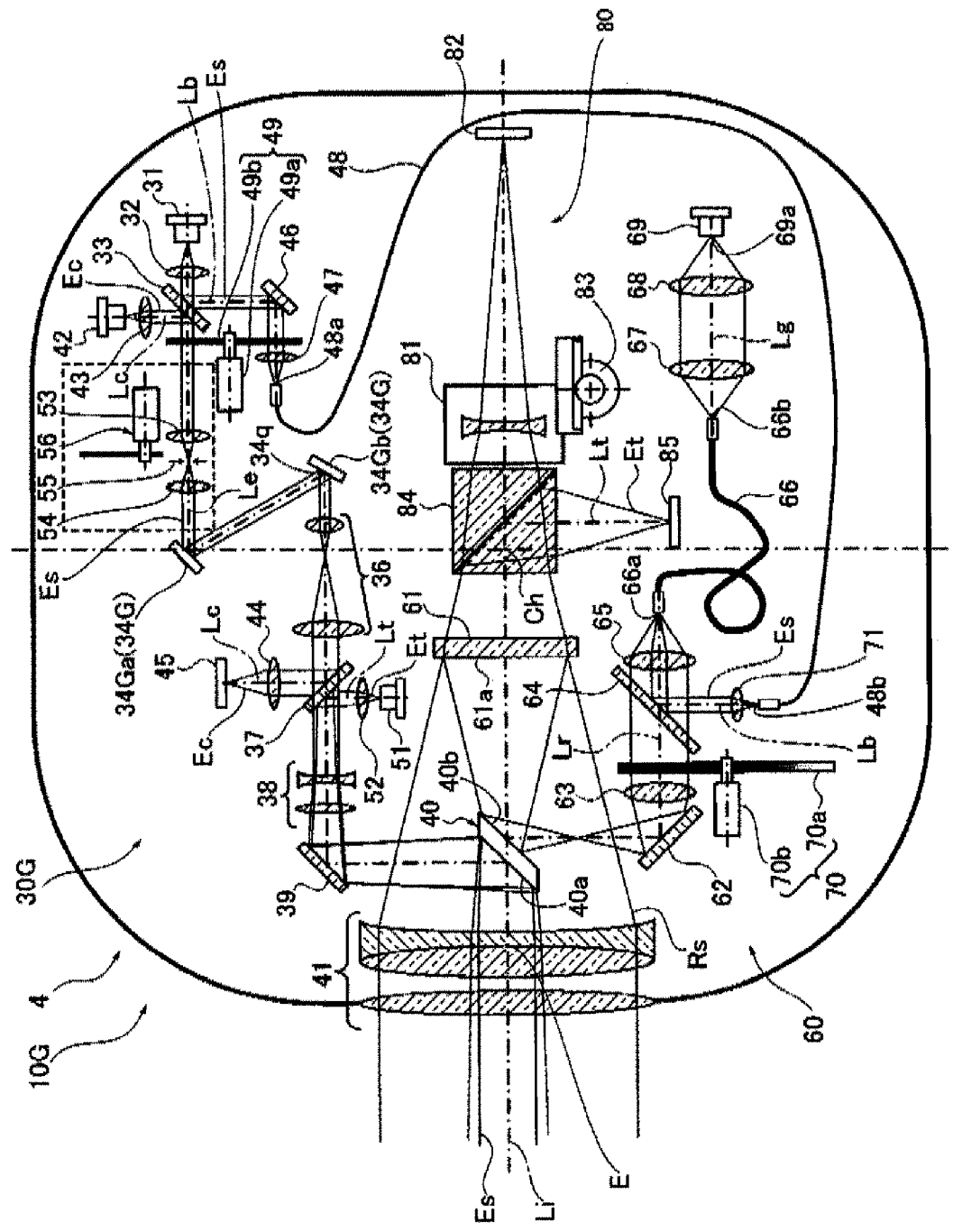
FIG. 20 is an explanatory diagram similar to FIG. 3, which illustrates the optical configuration of an optical distance measuring apparatus 10G of Embodiment 4.

As illustrated in FIG. 20, in the optical distance measuring apparatus 10G in Embodiment 4, only deflection unit 34G is provided between the lens 54 and the lens group 36 on the emission light axis Le in an emitting optical system 30G. That is to say, compared with the optical distance measuring apparatus 10A (see FIG. 11), the deflection unit 34 is replaced by the deflection unit 34G, and no lens group 35 is provided.

The deflection unit 34G includes a reflector 34Ga and a deflection device 34Gb that face each other on the emission light axis Le. The reflector 34Ga is provided fixed in the emission light path so as to reflect the light flux (the distance measurement emission light Es and the control support light Ec) onto the emission light axis Le toward the deflection device 34Gb, the light flux having passed through the lens 54. The deflection device 34Gb forms a reflection plane freely rotatable about two orthogonal axes parallel to a plane perpendicular to the emission light axis Le. That is to say, the deflection device 34Gb is configured to have a reflection plane rotatable about (see FIG. 4) the rotation axis 34c (the y-axis direction) and the rotation axis 34d (the x-axis direction) in the deflection unit 34 of the optical distance measuring apparatus 10A so that the traveling direction of incident light flux can be changed to one direction (the x-axis direction) and to the other direction orthogonal to the one direction (the y-axis direction) that are on the plane perpendicular to the emission light axis Le. In Embodiment 4, the deflection device 34Gb (not shown) is formed with a two-axis MEMS mirror which is obtained by etching an Si substrate using a photolithography technique. In the deflection unit 34G, under the control of the control calculation unit 19, the deflection device 34Gb can adjust the direction and a degree of inclination (the deflection position of the distance measurement emission light Es) with respect to the emission light axis Le. Similarly to the emitting optical system 30A in Embodiment 2, in the emitting optical system 30G, the center position 34q on the emission light axis Le in the reflection plane of the deflection device 34Gb and the emitting position E on the emission light axis Le are arranged to have an optically conjugate relationship.

In the emitting optical system 30G, a light flux emitted from the light source for distance measurement 31 and has passed through the lens 32, the half mirror 33, lens 53, the aperture 55, and the lens 54 (and also the diffuser unit 56a depending on a switching state) is reflected onto the emission light axis Le by the reflector 34Ga of the deflection unit 34G toward the deflection device 34Gb. The deflection device 34Gb reflects the light flux reflected by the reflector 34Ga toward the lens group 36 in an adjusted direction with respect to the emission light axis Le. That is to say, the emitting optical system 30G can set the traveling direction of the distance measurement emission light Es and the control support light Ec that are emitted from the objective lens group 41 by adjusting inclination of (the reflection plane of) only the deflection device 34Gb of the deflection unit 34G. With the configuration of the deflection unit 34G in Embodiment 4, when the direction of one of the rotatable axes in the deflection device 34Gb is set to be perpendicular to a plane containing the emission light axis Le on the side incident to the deflection device 34Gb and the emission light axis Le on the side reflecting from the deflection device 34Gb, the direction of the other of the rotatable axes cannot be set in the same manner. Therefore, when the deflection position is adjusted to the direction of the one axis, in addition to the rotation angle around the other axis, the rotation angle around the one axis needs to be integrally adjusted.

The optical distance measuring apparatus 10G in Embodiment 4 basically has a similar configuration to that of the optical distance measuring apparatus 10A in Embodiment 2, thus similar effects to those of Embodiment 2 can be obtained basically.

In addition, in the optical distance measuring apparatus 10G in Embodiment 4, the traveling direction of distance measurement emission light Es and the control support light Ec that are emitted from the objective lens group 41 can be set by only driving the deflection device 34Gb of the deflection unit 34G. Thus, when the deflection position (the direction and the degree of inclination with respect to the irradiation light axis Li) is adjusted, only a single deflection device 34Gb should be drive-controlled, thus control for adjusting the deflection position can be made easy.

Consequently, the optical distance measuring apparatus 10G according to the present invention enables the distance to a desired position to be measured without causing the collimation direction to be changed.

[Embodiment 5]

Next, an optical distance measuring apparatus 10H according to Embodiment 5 of the present invention is described with reference to FIG. 21. Embodiment 5 is an example having the same configuration as the optical distance measuring apparatus 10A in Embodiment 2 except for the deflection unit in the optical distance measuring apparatus 10A. The optical distance measuring apparatus 10H in Embodiment 5 has a basic configuration substantially similar to that of the above-described optical distance measuring apparatus 10A in Embodiment 2, thus the portions having the same configuration as in Embodiment 2 are labeled with the same reference symbols, and detailed description is omitted.

Figure 21:
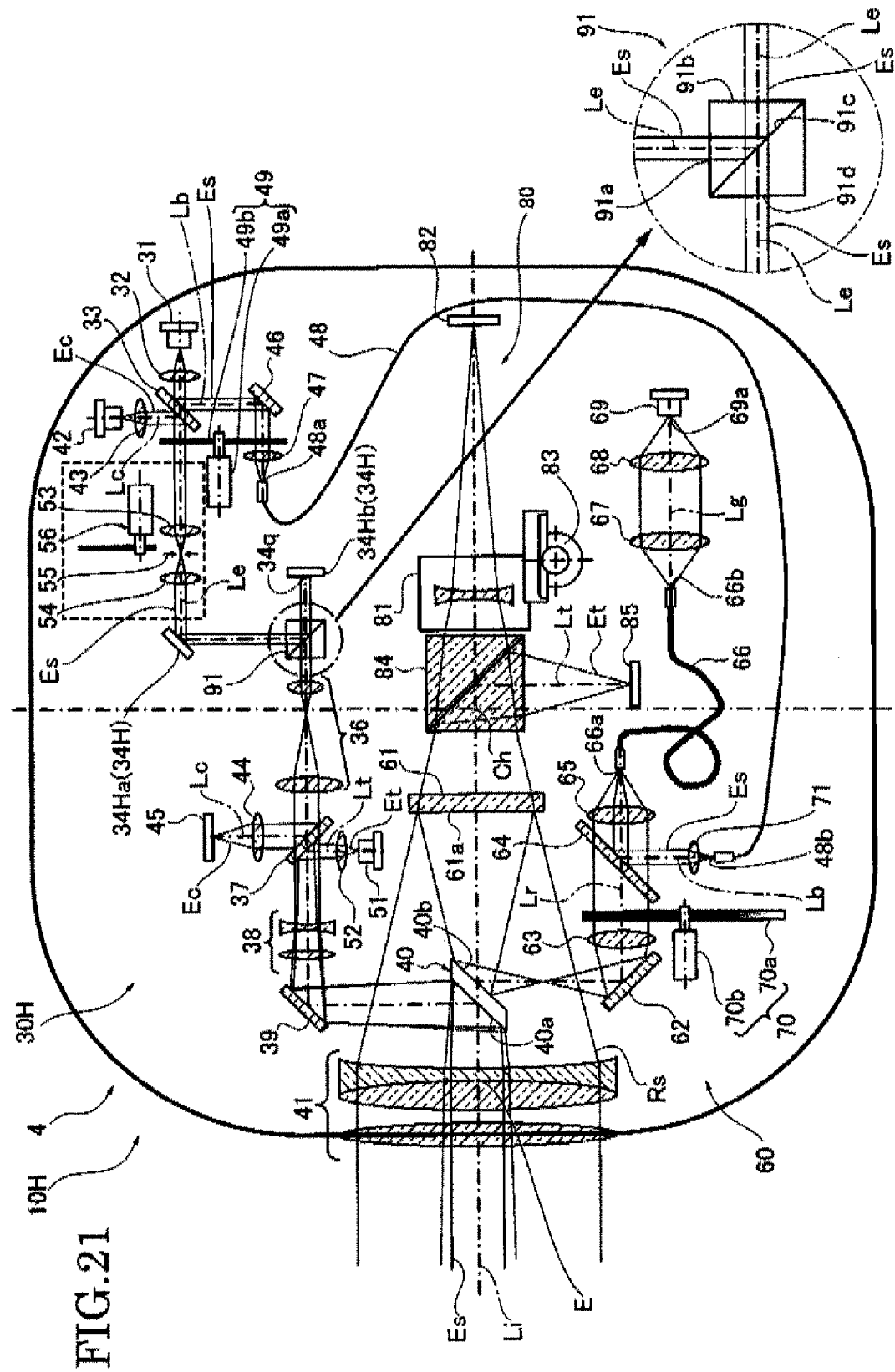
FIG. 21 is an explanatory diagram similar to FIG. 3, which illustrates the optical configuration of an optical distance measuring apparatus 10H of Embodiment 5.

As illustrated in FIG. 21, in the optical distance measuring apparatus 10H in Embodiment 5, a deflection unit 34H and a half beam splitter 91 are provided between the lens 54 and the lens group 36 on the emission light axis Le in an emitting optical system 30H. That is to say, compared with the optical distance measuring apparatus 10A (see FIG. 11), the deflection unit 34 is replaced by the deflection unit 34H and the half beam splitter 91, and no lens group 35 is provided.

In the emitting optical system 30H, the reflector 34Ha is provided fixed on the emission light path so as to reflect the light flux (the distance measurement emission light Es and the control support light Ec) onto the emission light axis Le toward the half beam splitter 91, the light flux having passed through the lens 54. The half beam splitter 91 generally presents a rectangular shape, and is provided such that an incident plane 91a is perpendicular to the emission light axis Le from the reflector 34Ha, and an incident/emission plane 91b perpendicular to the incident plane 91a faces the deflection device 34Hb. The half beam splitter 91 is provided with a reflection plane 91c which allows the light flux incident from the incident plane 91a to be emitted from the incident/emission plane 91b. An emission plane 91d is on the opposite side of the incident/emission plane 91b with respect to the reflection plane 91c. The reflection plane 91c forms a half mirror.

The deflection device 34Hb which faces the incident/emission plane 91b forms a reflection plane freely rotatable about two orthogonal axes parallel to a plane perpendicular to the emission light axis Le. That is to say, the deflection device 34Hb is configured to have a reflection plane rotatable about (see FIG. 4) the rotation axis 34c (the y-axis direction) and the rotation axis 34d (the x-axis direction) in the deflection unit 34 of the optical distance measuring apparatus 10A so that the traveling direction of incident light flux can be changed to one direction (the x-axis direction) and to the other direction orthogonal to the one direction (the y-axis direction) that are on the plane perpendicular to the emission light axis Le. In Embodiment 5, the deflection device 34Hb (not shown) is formed with a two-axis MEMS mirror which is obtained by etching an Si substrate using a photolithography technique. In the deflection unit 34H, under the control of the control calculation unit 19, the deflection device 34Hb can adjust the direction and a degree of inclination (the deflection position of the distance measurement emission light Es) with respect to the emission light axis Le. Similarly to the emitting optical system 30A in Embodiment 2, in the emitting optical system 30H, the center position 34q on the emission light axis Le in the reflection plane of the deflection device 34Hb and the emitting position E on the emission light axis Le are arranged to have an optically conjugate relationship.

In the emitting optical system 30H, the light flux (the distance measurement emission light Es and the control support light Ec) which has passed through the lens 54 is reflected onto the emission light axis Le by the reflector 34Ha toward (the incident plane 91a of) the half beam splitter 91. In the half beam splitter 91, part of the incident light flux from the incident plane 91a is reflected by the reflection plane 91C into the direction perpendicular to the incident direction. The light flux reflected by the reflection plane 91c is emitted from the incident/emission plane 91b onto the emission light axis Le toward the deflection device 34Hb. Here, the deflection device 34Hb is set to have a reflection plane perpendicular to the emission light axis Le from the incident/emission plane 91b in a standard state (with respect to which rotation is measured, and the rotation angle is 0 degree in the state). Accordingly, the deflection device 34Hb reflects the light flux on the emission light axis Le toward the incident/emission plane 91b (the half beam splitter 91) in a standard state, the light flux has been emitted from the incident/emission plane 91b. In the half beam splitter 91, part of the incident light flux from the incident/emission plane 91b passes through the reflection plane 91c and is directed to the emission plane 91d on the emission light axis Le. The light flux which has passed through the reflection plane 91c is emitted from the emission plane 91d toward the lens group 36 along the emission light axis Le. Subsequent operation is similar to that of the emitting optical system 30A of the optical distance measuring apparatus 10A in Embodiment 2.

Accordingly, in the emitting optical system 30H, the traveling direction of the distance measurement emission light Es and the control support light Ec that are emitted from the objective lens group 41 can be set by adjusting rotational attitude around the two orthogonal axes of the reflection plane of the deflection device 34Hb. Therefore, in the emitting optical system 30H, the reflector 34Ha and the deflection device 34Hb constitute the deflection unit 34H. The deflection device 34Hb is set to have a reflection plane perpendicular to the emission light axis Le from the incident/emission plane 91b in a standard state (with respect to which rotation is measured, and the rotation angle is 0 degree in the state). Thus, the direction of one of the rotatable axes is set to be perpendicular to a plane containing the emission light axis Le on the side incident to itself and the emission light axis Le on the side reflecting the incident light, and the direction of the other of the rotatable axes is also set in the same manner.

The optical distance measuring apparatus 10H in Embodiment 5 basically has a similar configuration to that of the optical distance measuring apparatus 10A in Embodiment 2, thus similar effects to those of Embodiment 2 can be obtained basically.

In addition, in the optical distance measuring apparatus 10H in Embodiment 5, the traveling direction of the distance measurement emission light Es and the control support light Ec that are emitted from the objective lens group 41 can be set by only driving the deflection device 34Hb of the deflection unit 34H. Thus, when the deflection position (the direction and the degree of inclination with respect to the irradiation light axis Li) is adjusted, only a single deflection device 34Hb should be drive-controlled, thus control for adjusting the deflection position (formation of the distance measurement irradiation point lm at the measurement point which is set as a desired position) can be made easy.

In the optical distance measuring apparatus 10H in Embodiment 5, for the directions of two orthogonal rotatable axes, the deflection device 34Hb is set to be perpendicular to a plane containing the emission light axis Le on the side incident to itself and the emission light axis Le on the side reflecting the incident light. Thus adjustment of a displacement in one direction (also referred to as x-axis direction) on a plane perpendicular to the emission light axis Le, and adjustment of a displacement in the other direction (also referred to as y-axis direction) on the plane can be made individually (effect of one displacement on the other displacement can be prevented). Therefore, control for adjusting the deflection position (formation of the distance measurement irradiation point lm at the measurement point which is set as a desired position) can be made easy.

Consequently, the optical distance measuring apparatus 10H according to the present invention enables the distance to a desired position to be measured without causing the collimation direction to be changed.

[Embodiment 6]

Next, an optical distance measuring apparatus 10I according to Embodiment 6 of the present invention is described with reference to FIG. 22. Embodiment 6 is an example having the same configuration as the optical distance measuring apparatus 10A in Embodiment 2 except for the deflection unit in the optical distance measuring apparatus 10A. The optical distance measuring apparatus 10I in Embodiment 6 has a basic configuration substantially similar to that of the above-described optical distance measuring apparatus 10A in Embodiment 2, thus the portions having the same configuration as in Embodiment 2 are labeled with the same reference symbols, and detailed description is omitted.

Figure 22:
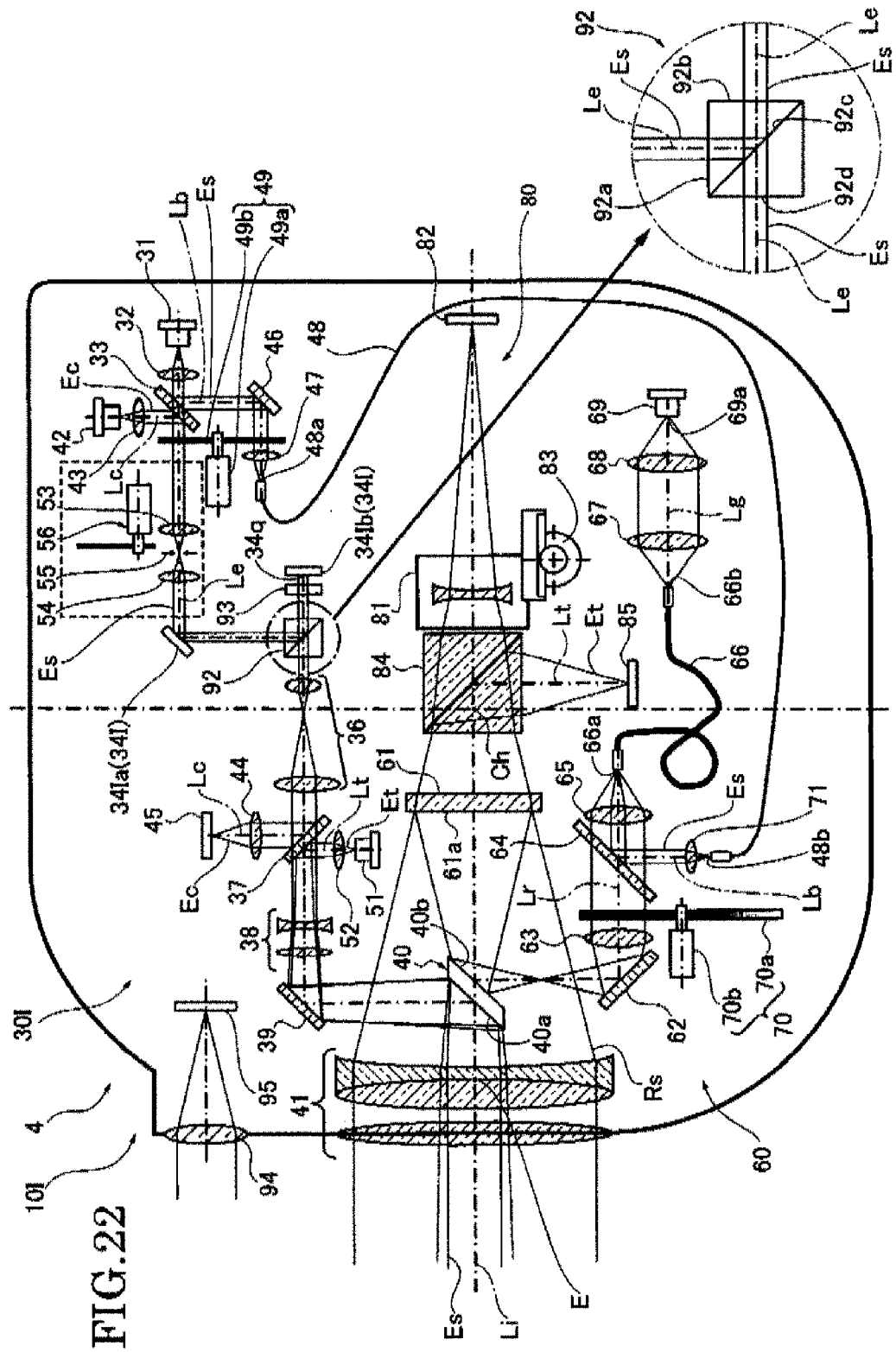
FIG. 22 is an explanatory diagram similar to FIG. 3, which illustrates the optical configuration of an optical distance measuring apparatus 10I of Embodiment 6.

As illustrated in FIG. 22, in the optical distance measuring apparatus 10I in Embodiment 5, a deflection unit 34I, a polarization beam splitter 92, and a π/4 wave plate 93 are provided between the lens 54 and the lens group 36 on the emission light axis Le in an emitting optical system 30I. That is to say, compared with the optical distance measuring apparatus 10A (see FIG. 11), the deflection unit 34 is replaced by the deflection unit 34I, the polarization beam splitter 92, and the π/4 wave plate 93, and no lens group 35 is provided.

In the emitting optical system 30I, the reflector 34Ia is provided fixed on the emission light path so as to reflect the light flux (the distance measurement emission light Es and the control support light Ec) onto the emission light axis Le toward the polarization beam splitter 92, the light flux having passed through the lens 54. The polarization beam splitter 92 generally presents a rectangular shape, and is provided such that an incident plane 92a is perpendicular to the emission light axis Le from the reflector 34Ia, and an incident/emission plane 92b perpendicular to the incident plane 92a faces the π/4 wave plate 93. The polarization beam splitter 92 is provided with a reflection plane 92c which allows the light flux incident from the incident plane 92a to be emitted from the incident/emission plane 92b. An emission plane 92d is on the opposite side of the incident/emission plane 92b with respect to the reflection plane 92c. The reflection plane 92c forms a polarization reflection plane, and is set to reflect the light flux (the distance measurement emission light Es and the control support light Ec) which has passed through the lens 54, and is reflected by the reflector 34Ia, then is made incident to the polarization beam splitter 92.

The π/4 wave plate 93 which faces the incident/emission plane 92b shifts an optical path difference by π/4 wavelength, and is also referred to as a π/4 phase difference plate. The π/4 wave plate 93 is provided so as to be perpendicular to the emission light axis Le. A light flux which has passed through the π/4 wave plate 93 is directed to the deflection device 34Ib along the emission light axis Le. The deflection device 34Ib forms a reflection plane freely rotatable about two orthogonal axes parallel to a plane perpendicular to the emission light axis Le. That is to say, the deflection device 34Ib is configured to have a reflection plane rotatable about (see FIG. 4) the rotation axis 34c (the y-axis direction) and the rotation axis 34d (the x-axis direction) in the deflection unit 34 of the optical distance measuring apparatus 10A so that the traveling direction of incident light flux can be changed to one direction (the x-axis direction) and to the other direction orthogonal to the one direction (the y-axis direction) that are on the plane perpendicular to the emission light axis Le. In Embodiment 6, the deflection device 34Ib (not shown) is formed with a two-axis MEMS mirror which is obtained by etching an Si substrate using a photolithography technique. In the deflection unit 34I, under the control of the control calculation unit 19, the deflection device 34Ib can adjust the direction and a degree of inclination (the deflection position of the distance measurement emission light Es) with respect to the emission light axis Le. Similarly to the emitting optical system 30A in Embodiment 2, in the emitting optical system 30I, the center position 34q on the emission light axis Le in the reflection plane of the deflection device 34Ib and the emitting position E on the emission light axis Le are arranged to have an optically conjugate relationship.

In the emitting optical system 30I, the light flux (the distance measurement emission light Es and the control support light Ec) which has passed through the lens 54 is reflected onto the emission light axis Le by the reflector 34Ia toward (the incident plane 92a of) the polarization beam splitter 92. In the polarization beam splitter 92, the incident light flux from the incident plane 92a is reflected by the reflection plane 92C into the direction perpendicular to the incident direction. The light flux reflected by the reflection plane 92c is emitted from the incident/emission plane 92b to the π/4 wave plate 93 along the emission light axis Le, and passes through the π/4 wave plate 93 to be directed to the deflection device 34Ib. The deflection device 34Ib is set to have a reflection plane perpendicular to the emission light axis Le from the incident/emission plane 92b in a standard state (with respect to which rotation is measured, and the rotation angle is 0 degree in the state). Accordingly, the deflection device 34Ib reflects the light flux emitted from the incident/emission plane 92b to the π/4 wave plate 93 along the emission light axis Le, then the light flux passes through the π/4 wave plate 93 and is incident on the incident/emission plane 92b (the polarization beam splitter 92) along the emission light axis Le. In the polarization beam splitter 92, the incident light flux from the incident/emission plane 92b passes through the reflection plane 92c and is directed to the emission plane 92d along the emission light axis Le. The light flux which has passed through the reflection plane 92c is emitted from the emission plane 92d toward the lens group 36 along the emission light axis Le. Subsequent operation is similar to that of the emitting optical system 30A of the optical distance measuring apparatus 10A in Embodiment 2.

Accordingly, in the emitting optical system 30I, the traveling direction of the distance measurement emission light Es and the control support light Ec that are emitted from the objective lens group 41 can be set by adjusting rotation posture around the two orthogonal axes of the reflection plane of the deflection device 34Ib. Therefore, in the emitting optical system 30I, the reflector 34Ia and the deflection device 34Ib constitute the deflection unit 34I. The deflection device 34Ib is set to have a reflection plane perpendicular to the emission light axis Le from the incident/emission plane 92b in a standard state (with respect to which rotation is measured, and the rotation angle is 0 degree in the state). Thus, the direction of one of the rotatable axes is set to be perpendicular to a plane containing the emission light axis Le on the side incident to itself and the emission light axis Le on the side reflecting the incident light, and the direction of the other of the rotatable axes is also set in the same manner.

The optical distance measuring apparatus 10I in Embodiment 6 includes a lens 94 (corresponding to the second telescope 11) which constitutes the second telescope having a magnification and a range of visual field respectively lower and wider than those of the first telescope 8, and an image capturing device 95 (corresponding to the second image capturing unit 12). The lens 94 is set to have a visual field wider than those (see the image P in FIG. 6) of the objective lens group 41 and the image-forming lens 81 in the observation optical system 80 that constitute the first telescope 8, and the image formation position is provided with the image capturing device 95. The image capturing device 95, when receiving incident light to the receiving surface, outputs an electric signal according to the quantity of light to the image processing unit 21 via the control calculation unit 19. The control calculation unit 19 (the control unit 18) is configured to select (switch) between generating an image based on an output signal from the above-described image capturing device 82, and generating an image based on an output signal from the image capturing device 95. The selection (switching) may be made by a user's operation of the operation input unit 7 (the operation input unit 25b of the remote controller 25) or the display unit 6 (the display unit 25a (see FIG. 10)) which is equipped with a touch panel feature, or may be made by determination of the control calculation unit 19. The image processing unit 21 performs image processing as needed on the electric signal outputted from selected one of the image capturing device 82 and the image capturing device 95, and generates an image signal, and outputs the image signal to the display unit 6 (the display unit 25a). The display unit 6 (the display unit 25a) displays an image which is set in a predetermined visual field, i.e., an angle of view in the first telescope 8 or the second telescope (the second telescope 11) in accordance with the image signal from the image processing unit 21. Consequently, the optical distance measuring apparatus 10I can obtain an image with a desired magnification by controlling switching between the second telescope and the first telescope 8.

In the optical distance measuring apparatus 10I in Embodiment 6, in addition to that an arbitrary position in an image P from the image capturing device 82 can be designated as a measurement point, the image P being acquired through the first telescope 8, an arbitrary position in an image (for example, see P1 in FIG. 8A) from the image capturing device 95 (the second image capturing unit 12) can be designated as a measurement point, the image being acquired through the second telescope. The image (see P1 in FIG. 8A) from the image capturing device 95 (the second image capturing unit 12) allows acquisition of scene in a wider range than the scene acquired by the image P (for example, see P2 in FIG. 8B) from the image capturing device 82. Thus, in the optical distance measuring apparatus 10I, when an arbitrary position in an image (not shown) from the image capturing device 95 is designated as a measurement point, in order to adjust the deflection position (formation of the distance measurement irradiation point lm at the measurement point which is set as a desired position), in addition to the adjustment which is made by controlling the deflection unit 34I, i.e., the deflection device 34Ib in accordance with the visual field set as the second telescope (the second telescope 11), the rotational attitude of the mount portion 3 and the lens-barrel portion 4 is integrally adjusted by controlling the horizontal drive unit 14 and the vertical drive unit 16 (see FIG. 2) as needed.

The optical distance measuring apparatus 10I in Embodiment 6 basically has a similar configuration to that of the optical distance measuring apparatus 10A in Embodiment 2, thus similar effects to those of Embodiment 2 can be obtained basically.

In addition, in the optical distance measuring apparatus 10I in Embodiment 6, the traveling direction of the distance measurement emission light Es and the control support light Ec that are emitted from the objective lens group 41 can be set by only driving the deflection device 34Ib of the deflection unit 34I. Thus, when the deflection position (the direction and the degree of inclination with respect to the irradiation light axis Li) is adjusted, only a single deflection device 34Ib should be drive-controlled, thus control for adjusting the deflection position can be made easy.

In the optical distance measuring apparatus 10I in Embodiment 6, for the directions of two orthogonal rotatable axes, the deflection device 34Ib is set to be perpendicular to a plane containing the emission light axis Le on the side incident to itself and the emission light axis Le on the side reflecting the incident light. Thus adjustment of a displacement in one direction (also referred to as x-axis direction) on a plane perpendicular to the emission light axis Le, and adjustment of a displacement in the other direction (also referred to as y-axis direction) on the plane can be made individually (effect of one displacement on the other displacement can be prevented). Therefore, control for the formation of the distance measurement irradiation point lm at the measurement point which is set as a desired position can be made easy.

Furthermore, in the optical distance measuring apparatus 10I in Embodiment 6, the emitting optical system 30I has a configuration such that the reflection plane 92c of the polarization beam splitter 92 forms a polarization reflection plane, and a light flux reflected by the reflection plane 92c travels between the reflection plane 92c and π/4 wave plate 93, then returns to the reflection plane 92c again. Thus, a decrease in the quantity of light of the distance measurement emission light Es and the control support light Ec can be reduced. Consequently, the distance measurement emission light Es and the control support light Ec can be emitted from the objective lens group 41 more efficiently by setting the traveling direction.

In the optical distance measuring apparatus 10I in Embodiment 6, in addition to that an arbitrary position in an image P (see P2 in FIG. 8B) from the image capturing device 82 can be designated as a measurement point, the image P being acquired through the first telescope 8, an arbitrary position in an image P (see P1 in FIG. 8A) from the image capturing device 95 (the second image capturing unit 12) can be designated as a measurement point, the image being acquired through the second telescope (the second telescope 11). Consequently, the distance to a desired position over a wide range can be measured.

Consequently, the optical distance measuring apparatus 10I according to the present invention enables the distance to a desired position to be measured without causing the collimation direction to be changed.

Although the optical distance measuring apparatus according to the present invention has been described in the above embodiments (including the modifications), the optical distance measuring apparatus may be an optical distance measuring apparatus which emits emission light from a light source to an object and receives reflection light from the object with a light-receiving unit, and performs distance measurement based on the emission light and the reflection light, in which an optical path to an irradiation light axis from the light source to the object is provided with a deflection mechanism configured to deflect a direction of the emission light with respect to the emission light axis of the light source, and the deflection mechanism has an optically conjugate relationship with a predetermined position on the emission light axis or on the irradiation light axis, which is on a side of the object with respect to the deflection mechanism when viewed from the light source. Thus the invention is not limited to the above-described embodiments.

In the above-described embodiments (including the modifications), the emitting position E of the irradiation light axis Li is set as the position which has an optically conjugate relationship with the position on the emission light axis Le in the reflection plane for the adjustment of the deflection position by the deflection unit. However, the emitting position E may be on the side of an object (object side) with respect to the deflection unit, and on the emission light axis Le or the irradiation light axis Li. Thus the invention is not limited to the above-described embodiments. With such a configuration, thus defined emitting position E can be a substantial emitting position of the distance measurement emission light Es emitted from the objective lens group 41 in the viewpoint of setting the direction and the degree of inclination with respect to the irradiation light axis Li.

In the above-described embodiments (including the modifications), the display unit 6 as a display and the operation input unit 7 as a measurement point identification device are provided in the mount portion 3. However, the display may be any device that can display an image acquired by the observation optical system (image acquisition device) under the control of the control calculation unit 19, and the measurement point identification device may be any device that can identify a measurement point in an image displayed by the display device under the control of the control calculation unit 19. Thus the invention is not limited to the above-described embodiments.

In the above-described embodiments (including the modifications), after the deflection position in the deflection unit is set, the distance measurement emission light Es is emitted from the objective lens group 41 using the preset emitting optical system. However, while the deflection position in the deflection unit is being changed, the distance measurement emission light Es may be emitted from the objective lens group 41 (distance measurement is performed). In this case, the distance measurement emission light Es and the control support light Ec are preferably emitted with a time difference which would not cause an error between the recognized deflection position in the deflection unit (34) by using the control support light Ec, and the position (position at which the distance measurement irradiation point Im is formed) which is irradiated with the distance measurement emission light Es. The distance measurement emission light Es and the control support light Ec are preferably emitted simultaneously.

In Embodiments 2 to 6 (including the modifications), the observation optical system 80 forms an image on the image capturing device 82 using the image-forming lens 81, and the image P based on an output signal from the image capturing device 82 is displayed by the display unit 6. However, as illustrated in FIG. 9, a configuration may be made such that a telescope is provided which a user looks into, or a telescope and the display unit 6 are both provided, and thus the invention is not limited to the above-described Embodiments 2 to 6. The second telescope may be provided as described in Embodiment 6.

In Embodiments 2 to 6, a remote operation using the remote controller 25 has been implemented. However, a configuration may be made such that the remote controller 25 is used in Embodiment 1, or the remote controller 25 is not used in Embodiments 2 to 6, and thus the invention is not limited to the above-described Embodiments 2 to 6.

In the above-described embodiments (including the modifications), the optical position sensor 45 is used for the control of the deflection position in the deflection unit (34). However, the tracking area CCD 85 may be used, and the invention is not limited to the above-described embodiments.

In the above-described embodiments (including the modifications), one-axis or two-axis MEMS mirror is used to constitute the deflection unit (34). However, as long as an inclination of the traveling direction of a light flux toward the deflection unit, with respect to the emission light axis Le can be changed under the control of the control calculation unit 19, a galvanomirror may be used, for example, and the invention is not limited to the above-described embodiments.

Although not expressly described in the distance measurement (distance measurement operation) using the distance measurement emission light Es in the above-described embodiments (including the modifications), estimate of EDM light quantity (estimate of light quantity in the optical distance measurement) may be made based on an output signal (quantity of received light) from the tracking area CCD 85. In this case, EDM light control time (a time required for the adjustment of the light quantity for optical distance measurement) can be reduced.

In the above, the optical distance measuring apparatus of the present invention has been described based on the embodiments (including the modifications), however specific configuration is not limited to the embodiments, and as long as not departing from the spirit of the present invention, modifications and additions to the design are allowed.

According to the optical distance measuring apparatus of the present invention, the deflection mechanism can adjust an inclination of the direction of the emission light (traveling direction) with respect to the emission light axis so that the emission light is emitted to an object on the irradiation light axis, therefore a desired position can be irradiated with the distance measurement emission light, and the distance to the desired position can be measured without causing the collimation direction to be changed.

The deflection mechanism, which sets an inclination of the direction of the distance measurement emission light with respect to the emission light axis, has an optically conjugate relationship with a predetermined position on the emission light axis or on the irradiation light axis, which is on the side of the object with respect to the deflection mechanism when viewed from the light source. Thus, in the viewpoint of setting the inclination of (the traveling direction of) the emission light with respect to the irradiation light axis, the substantial emitting position to the object can be a predetermined position on the emission light axis or the irradiation light axis. Accordingly, the actual direction of the emission light for distance measurement can be set by adjusting the inclination of (the traveling direction of) the emission light with respect to the emission light axis by the deflection mechanism.

In addition to the above-described configuration, the optical distance measuring apparatus further includes the observation optical system that enables a predetermined visual field centered on the irradiation light axis to be observed, in which the deflection mechanism is configured to incline the direction of the emission light with respect to the emission light axis based on the position on the visual field of the observation optical system. Consequently, a measurement point can be set based on visual recognition by using the observation optical system, thus a desired position can be easily identified.

In addition to the above-described configuration, the deflection mechanism is an MEMS mirror, thus allowing a considerably small configuration, while extremely high adjustment accuracy can be obtained in the irradiation position caused by the emission light, and adjustment speed can be significantly increased.

In addition to the above-described configuration, the deflection mechanism is a galvanomirror, thus allowing a considerably small configuration, while extremely high adjustment accuracy can be obtained in the irradiation position caused by the emission light, and adjustment speed can be significantly increased.

In addition to the above-described configuration, the optical distance measuring apparatus further includes the irradiation area switching device in the optical path from the light source to the deflection mechanism. The irradiation area switching device is configured to change the dimension of an irradiation area which is formed by the emission light in the object. Consequently, a desired position can be irradiated with the distance measurement emission light Es, and the distance to the desired position can be measured without causing the collimation direction to be changed, and the area as the desired position (measurement point) for performing distance measurement can be changed.

In addition to the above-described configuration, the irradiation area switching device is formed of a diffusing optical member configured to diffuse a light flux which is directed from the light source to the deflection mechanism. Consequently, the irradiation area switching device can be easily formed.

In addition to the above-described configuration, the irradiation area switching device is formed of a refractive optical member configured to change a spread angle of a light flux which is directed from the light source to the deflection mechanism. Consequently, the irradiation area switching device can be easily formed.

In addition to the above-described configuration, the optical distance measuring apparatus further includes: the image acquisition device configured to acquire an image of a predetermined visual field centered on the irradiation light axis; the display configured to display the image acquired by the image acquisition device; the measurement point identification device configured to identify a measurement point in the image displayed by the display; and the control calculator configured to set a reflection direction in the deflection mechanism based on the measurement point in the image identified by the measurement point identification device. Consequently, a measurement point can be set in the image displayed by the display, and the inclination of the direction of the distance measurement emission light with respect to the emission light axis can be set based on the measurement point in the image, thus the distance to a desired position can be easily measured.

What is claimed is:

1. An optical distance measuring apparatus which emits emission light from a light source to an object and receives reflection light from the object with a light-receiving unit, and performs distance measurement based on the emission light and the reflection light, the light source having an emission light axis and emits the emission light along the emission light axis; and the emission light being irradiated from the optical distance measuring apparatus along an irradiation light axis, comprising:

a deflection mechanism provided in an optical path from the light source to the irradiation light axis, wherein the deflection mechanism includes a reflection plane configured to reflect the emission light to incline a direction of the reflected emission light with respect to the emission light axis of the light source, and configured to rotate about two axes intersecting one another so as to change the direction of the reflected emission light to be inclined, wherein the deflection mechanism has an optically conjugate relationship with a predetermined position on the emission light axis or on the irradiation light axis, the predetermined position being closer to the object than the deflection mechanism when viewed from the light source.

2. The optical distance measuring apparatus according to claim 1, further comprising an observation optical system configured to observe a predetermined visual field with the irradiation light axis at a center of the predetermined visual field, wherein the deflection mechanism is configured to incline the direction of the emission light with respect to the emission light axis based on a position on the visual field of the observation optical system.

3. The optical distance measuring apparatus according to claim 1, wherein the deflection mechanism is an MEMS minor.

4. The optical distance measuring apparatus according to claim 1, wherein the deflection mechanism is a galvanomirror.

5. The optical distance measuring apparatus according claim 1, further comprising an irradiation area switching device in an optical path from the light source to the deflection mechanism, the irradiation area switching device being configured to change a dimension of an irradiation area which is formed on the object by the emission light irradiated from the optical distance measuring apparatus.

6. The optical distance measuring apparatus according to claim 5, wherein the irradiation area switching device is formed of a diffusing optical member configured to diffuse a light flux of the emission light which is directed from the light source to the deflection mechanism.

7. The optical distance measuring apparatus according to claim 5, wherein the irradiation area switching device is formed of a refractive optical member configured to change a spread angle of a light flux of the emission light which is directed from the light source to the deflection mechanism.

8. The optical distance measuring apparatus according to claim 1, further comprising:

an image acquisition device configured to acquire an image of a predetermined visual field with the irradiation light axis at a center of the predetermined visual field;

a display configured to display the image acquired by the image acquisition device;

a measurement point identification device configured to identify a measurement point in the image displayed by the display; and a control calculator configured to set the direction of the reflected emission light to be inclined by the deflection mechanism based on the measurement point in the image identified by the measurement point identification device.

* * * * *